United States Patent
Yu et al.

(10) Patent No.: US 10,590,279 B2
(45) Date of Patent: Mar. 17, 2020

(54) COMPOSITION AND AN ARTICLE OF MANUFACTURE COMPRISING THE SAME

(71) Applicant: Dow Global Technologies LLC, Midland, MI (US)

(72) Inventors: Brian Yu, Shanghai (CN); Youngchun Chen, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 362 days.

(21) Appl. No.: 15/324,773

(22) PCT Filed: Jul. 10, 2015

(86) PCT No.: PCT/CN2015/083785
§ 371 (c)(1),
(2) Date: Jan. 9, 2017

(87) PCT Pub. No.: WO2016/004898
PCT Pub. Date: Jan. 14, 2016

(65) Prior Publication Data
US 2017/0204272 A1    Jul. 20, 2017

(30) Foreign Application Priority Data

Jul. 11, 2014 (WO) ............... PCT/CN2014/082037

(51) Int. Cl.
| C09D 4/06 | (2006.01) |
| C09J 4/06 | (2006.01) |
| C08J 9/10 | (2006.01) |
| C08J 9/00 | (2006.01) |
| C09D 5/00 | (2006.01) |

(52) U.S. Cl.
CPC ............. *C09D 4/06* (2013.01); *C08J 9/0061* (2013.01); *C08J 9/0066* (2013.01); *C08J 9/103* (2013.01); *C09D 5/002* (2013.01); *C09J 4/06* (2013.01); *C08J 2203/04* (2013.01); *C08J 2323/08* (2013.01); *C08J 2423/08* (2013.01)

(58) Field of Classification Search
CPC ............................. C09D 4/06; C09D 153/02
USPC ............................................. 522/112; 525/96
See application file for complete search history.

(56) References Cited

U.S. PATENT DOCUMENTS

| 4,767,823 A | 8/1988 | Jones et al. |
| 4,789,699 A | 12/1988 | Kieffer et al. |
| 5,093,422 A | 3/1992 | Himes |
| 5,332,613 A | 7/1994 | Taylor et al. |
| 5,446,064 A | 8/1995 | Hori et al. |
| 6,582,829 B1 | 6/2003 | Quinn et al. |
| 7,763,692 B2 | 7/2010 | Tamai et al. |
| 7,858,706 B2 | 12/2010 | Arriola et al. |
| 8,163,846 B2 | 4/2012 | Johnson et al. |
| 8,450,430 B2 | 5/2013 | Silvis et al. |
| 2004/0087235 A1 | 5/2004 | Morman et al. |
| 2004/0122408 A1 | 6/2004 | Potnis et al. |
| 2004/0122409 A1 | 6/2004 | Thomas et al. |
| 2006/0183637 A1 | 8/2006 | Loughner et al. |
| 2007/0149710 A1 | 6/2007 | Chaudhary et al. |
| 2010/0009151 A1 | 1/2010 | Yun et al. |
| 2012/0058329 A1 | 3/2012 | Sazurai et al. |
| 2014/0102935 A1 | 4/2014 | Jayasuriya |

FOREIGN PATENT DOCUMENTS

| CN | 101481556 A | 7/2009 |
| EP | 0712892 B1 | 3/2002 |
| GB | 2064151 A | 6/1981 |
| JP | 2012046580 A | 3/2012 |
| WO | 2004/041538 A1 | 5/2004 |

OTHER PUBLICATIONS

Specialty Elastomers for Hose and Tube Applications, The Dow Chemical Company, 5 pages, published Mar. 2007 (Year: 2007).*

* cited by examiner

*Primary Examiner* — Fred M Teskin
(74) *Attorney, Agent, or Firm* — Quarles & Brady LLP

(57) ABSTRACT

The invention provides a composition comprising the following A)-C): A) one or more monomers and/or oligomers; B) at least one chlorinated olefin-based polymer and/or at least one functionalized chlorinated olefin-based polymer; and C) at least one styrene-based block copolymer or derivative. The invention also provides a composition comprising the following D)-F): D) at least one compound selected from the following i) through v): i) $Z^1—(CR^1R^2—O—C(O)—CR^3=CH_2)_2$ (Formula 1, as described herein); ii) $Z^2_{(4-x)}—C—[CR^4R^5—(R^6)_y—O—C(O)—CR^7=CH_2]_x$ (Formula 2, as described herein); iii) $Z^3_{(3-x)}—CR^8—[CR^9R^{10}—(R^{11})_y—O—C(O)—CR^{12}=CH_2]_x$ (Formula 3, as described herein); iv) $O—\{CR^{13}R^{14}—C(Z^4_{(3-x)})—[CR^{15}R^{16}—(R^{17})_y—O—C(O)—CR^{18}=CH_2]_x\}_2$ Formula 4, as described herein); v) a combination of two or more from Formulas 1 through 4 above; E) at least one chlorinated olefin-based polymer and/or at least one functionalized chlorinated olefin-based polymer; and F) at least one styrene-based block copolymer or derivative thereof.

18 Claims, 4 Drawing Sheets

FIG. 2

COMPOSITION AND AN ARTICLE OF MANUFACTURE COMPRISING THE SAME

RELATED APPLICATIONS

This application is a 371 US Application of PCT/CN2015/083785, filed on Jul. 10, 2015; which claims priority to PCT/CN2014/082037, filed Jul. 11, 2014, the disclosures of which are incorporated herein by reference.

BACKGROUND OF THE INVENTION

Olefin-based polymers can be produced with specially designed molecular weight and molecular weight distribution. This process affords some very unique characteristics to the products, and these polymers are finding many applications, for example, as shoe soles in footwear. Currently the materials used in footwear midsole are dominated by ethylene vinyl acetate copolymers (EVA). Olefin-based polymers (for example, POE (polyolefin elastomers) and OBC (olefin block copolymers)) have several advantages, compared with EVA, such as light weight (due to the comparatively low polymer density) which is a general trend in sole design. In addition, the comparatively high melting point of OBC also brings additional advantages such as low shrinkage, low compression set, and improved dynamic fatigue resistance at elevated temperatures, which are also very important in footwear production and use. Currently, OBC has been commercialized in several footwear applications, and it is expected there will be more applications in the future.

The non-polar molecular nature of the above mentioned olefin-based polymers makes them difficult to be bonded, painted, and printed, due to the low surface energy of the polyolefins. For example, in the assembling process, the midsole is bonded to the vulcanized rubber outsole, and to the shoe upper, which is usually made from natural/artificial leather. The existing maximum total olefin-based polymer loading in the midsole formulation cannot exceed 30% (the balance is EVA) due to adhesion issues of higher olefin-based polymer content compositions. Therefore, there is a need to improve the adhesion characteristics of the olefin-based polymer materials, so as to improve bonding, paintability and printability.

SUMMARY OF THE INVENTION

In one embodiment, the instant invention provides a composition comprising A) one or more monomers and/or oligomers selected from the group consisting of

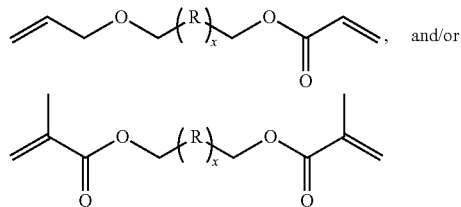

, and/or wherein each R is independently selected from the group consisting of the following: substituted or unsubstituted hydrocarbylenes, and substituted or unsubstituted hetero-hydrocarbylenes, each of the hydrocarbylenes and hetero-hydrocarbylenes having between 4 and 40 carbon atoms and x is any integer equal to or greater than 1; B) at least one chlorinated olefin-based polymer and/or at least one functionalized chlorinated olefin-based polymer; and C) one or more styrene-based block copolymer or derivative thereof.

The invention also provides a composition comprising the following D)-F):

D) at least one compound selected from the following i) through v):

i) $Z^1-(CR^1R^2-O-C(O)-CR^3=CH_2)_2$ (Formula 1); wherein, for Formula 1, $Z^1$ is selected from an unsubstituted hydrocarbylene, a substituted hydrocarbylene, an unsubstituted hetero-hydrocarbylene, or a substituted hetero-hydrocarbylene; each $R^1$ is independently selected from hydrogen or an alkyl; each $R^2$ is independently selected from hydrogen or an alkyl; $R^3$ is selected from hydrogen or an alkyl;

ii) $Z^2_{(4-x)}-C-[CR^4R^5-(R^6)_y-O-C(O)-CR^7=CH_2]_x$ (Formula 2), wherein for Formula 2, $Z^2$ is selected from hydrogen, an unsubstituted hydrocarbyl, a substituted hydrocarbyl, an unsubstituted hetero-hydrocarbyl, or a substituted hetero-hydrocarbyl; $R^4$ is selected from hydrogen or an alkyl; $R^5$ is selected from hydrogen or an alkyl; $R^6$ is selected from an unsubstituted hydrocarbylene, a substituted hydrocarbylene, an unsubstituted hetero-hydrocarbylene, or a substituted hetero-hydrocarbylene; $y \geq 0$; and when $y=0$, $R^6$ is not present; $R^7$ is selected from hydrogen or an alkyl; and x is from 1 to 4; and when $x=4$, $Z^2$ is not present;

iii) $Z^3_{(3-x)}-CR^8-[CR^9R^{10}-(R^{11})_y-O-C(O)-CR^{12}=CH_2]_x$ (Formula 3), wherein for Formula 3, $Z^3$ is selected from hydrogen, an unsubstituted hydrocarbyl, a substituted hydrocarbyl, an unsubstituted hetero-hydrocarbyl, or a substituted hetero-hydrocarbyl; $R^8$ is -(T-O-C(O)-CR=CH2) where R is hydrogen or alkyl, and T is selected from an unsubstituted hydrocarbylene, a substituted hydrocarbylene, an unsubstituted hetero-hydrocarbylene, or a substituted hetero-hydrocarbylene; $R^9$ is selected from hydrogen or an alkyl; $R^{10}$ is selected from hydrogen or an alkyl; $R^{11}$ is selected from an unsubstituted hydrocarbylene, a substituted hydrocarbylene, an unsubstituted hetero-hydrocarbylene, or a substituted hetero-hydrocarbylene; $y \geq 0$; and when $y=0$, $R^{11}$ is not present; $R^{12}$ is selected from hydrogen or an alkyl; and x is from 1 to 3; and when $x=3$, $Z^3$ is not present;

iv) $O-\{CR^{13}R^{14}-C(Z^4_{(3-x)})-[CR^{15}R^{16}-(R^{17})_y-O-C(O)-CR^{18}=CH_2]_x\}_2$ (Formula 4), wherein for Formula 4, $Z^4$ is selected from hydrogen, an unsubstituted hydrocarbyl, a substituted hydrocarbyl, an unsubstituted hetero-hydrocarbyl, or a substituted hetero-hydrocarbyl; $R^{13}$ is selected from hydrogen or an alkyl; $R1^4$ is selected from hydrogen or an alkyl; $R^{15}$ is selected from hydrogen or an alkyl; $R^{16}$ is selected from hydrogen or an alkyl; $R^{17}$ is selected from an unsubstituted hydrocarbylene, a substituted hydrocarbylene, an unsubstituted hetero-hydrocarbylene, or a substituted hetero-hydrocarbylene; $y \geq 0$, and when $y=0$, $R^{17}$ is not present; $R^{18}$ is selected from hydrogen or an alkyl; and x is from 1 to 3; and when $x=3$, $Z^4$ is not present;

v) a combination of two or more from Formulas 1 through 4 above;

E) at least one chlorinated olefin-based polymer and/or at least one functionalized chlorinated olefin-based polymer; and F) at least one styrene-based block copolymer or derivative thereof.

BRIEF DESCRIPTION OF THE DRAWINGS

FIG. 2 is a schematic diagram of a bonding process utilizing the inventive composition;

DETAILED DESCRIPTION OF THE INVENTION

Figure 1:
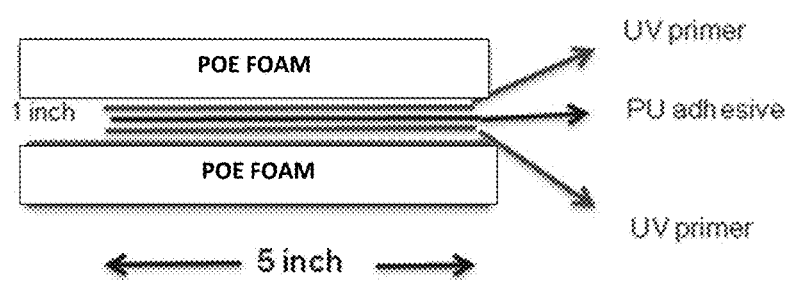
FIG. 1 is a schematic depicting a test sample for the T-Peel test.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities (for example, catalyst residues) may be incorporated into and/or within the polymer.

The term "interpolymer," as used herein, refers to polymers prepared by the polymerization of at least two different types of monomers. The generic term interpolymer includes copolymers (employed to refer to polymers prepared from two different types of monomers), and polymers prepared from more than two different types of monomers.

The term "olefin-based polymer," as used herein, refers to a polymer that comprises a majority amount of polymerized olefin monomer, for example ethylene or propylene (based on weight of the polymer) and, optionally, may contain at least one comonomer.

The term "ethylene-based polymer," as used herein, refers to a polymer that comprises a majority amount of polymerized ethylene monomer (based on weight of the polymer) and, optionally, may contain at least one comonomer.

The term "ethylene/α-olefin interpolymer," as used herein, refers to an interpolymer that comprises a majority amount of polymerized ethylene monomer (based on the weight of the interpolymer) and at least one α-olefin.

The term, "ethylene/α-olefin copolymer," as used herein, refers to a copolymer that comprises a majority amount of polymerized ethylene monomer (based on the weight of the copolymer), and an α-olefin, as the only two monomer types.

The term "propylene-based polymer," as used herein, refers to a polymer that comprises a majority amount of polymerized propylene monomer (based on weight of the polymer) and, optionally, may comprise at least one comonomer.

The term "propylene/α-olefin interpolymer," as used herein, refers to an interpolymer that comprises a majority amount of polymerized propylene monomer (based on the weight of the interpolymer) and at least one α-olefin. The α-olefin of a propylene/α-olefin interpolymer may be ethylene.

The term, "propylene/α-olefin copolymer," as used herein, refers to a copolymer that comprises a majority amount of polymerized propylene monomer (based on the weight of the copolymer), and an α-olefin, as the only two monomer types. The α-olefin of a propylene/α-olefin copolymer may be ethylene.

The term "composition," as used herein, includes a mixture of materials which comprise the composition, as well as reaction products and decomposition products formed from the materials of the composition.

As used herein, the term "chlorinated olefin-based polymer," refers to an olefin-based polymer comprising units derived from one or more chlorine-containing comonomers or an olefin-based polymer which is subjected to a chlorination reaction. Exemplary chlorination reactions are described in U.S. Pat. Nos. 7,763,692, 5,446,064, 4,767,823 and PCT Publication No. WO2008/002952, the disclosures of which are incorporated herein by reference.

In one embodiment, the chlorinated olefin-based polymer has a chlorine content of from 15 to 40 wt %, based on the weight of the polymer. All individual values and subranges from 15 to 40 wt % are included and disclosed herein; for example, the chlorine content can range from a lower limit of 15, 20, 25, 30 or 35 wt % to an upper limit of 20, 25, 30, 35, or 40 wt %.

Preferable examples of olefin-based polymers for use in the production of chlorinated olefin-based polymers include, but are not limited to, polypropylene-based polymers, such as, polypropylene homopolymers, propylene-alpha-olefin interpolymers and propylene-alpha-olefin copolymers; and ethylene-based polymers, such as, polyethylene homopolymers, ethylene-alpha-olefin interpolymers and ethylene-alpha-olefin copolymers.

Examples of alpha-olefins in propylene-alpha-olefin interpolymers and copolymers include ethylene or $C_{4-20}$ alpha-olefins, such as ethylene, 1-butene, 1-pentene, 1-hexene, 1-heptene, 1-octene, 1-decene, 1-dodecene, 1-hexadecene, 4-methyl-1-pentene.

Examples of alpha-olefins in ethylene-alpha-olefin copolymers include $C_{3-20}$ α-olefins, such as propylene, 1-butene, 1-pentene, 1-hexene, 1-heptene, 1-octene, 1-decene, 1-dodecene, 1-hexadecene, 4-methyl-1-pentene.

In one embodiment, the chlorinated olefin-based polymer has a weight average molecular weight, Mw, from 25,000 to 125,000 g/mole. All individual values and subranges from 25,000 to 125,000 are included and disclosed herein; for example, the Mw can be from a lower limit of 25000, 50000, 75000, or 100000 g/mole to an upper limit of 50000, 75000, 100000, or 125000. For example, the Mw can be from 25000 to 125000, or in the alternative, from 25000 to 75000, or in the alternative, from 75000 to 125000, or in the alternative, from 50000 to 100000.

Examples of chlorinated ethylene-based polymers include those prepared from copolymers comprising ethylene and at least one ethylenically unsaturated monomer, selected from the group consisting of $C_3$-$C_8$ alpha-olefins.

Specific examples of suitable chlorinated ethylene-based copolymers, which may be employed in the compositions of this invention, include copolymers of ethylene with propylene, 1-butene, 3-methyl-1-pentene, 1-pentene, 1-hexene, 1-heptene or octene.

Examples of chlorinated propylene-based polymers (not functionalized) include HARDLEN DX-526P and HARDLEN 14-LWP which are commercially available from Toyo Kasei Kogyo Company (Japan).

Examples of chlorinated ethylene-based polymers include the TYRIN chlorinated polyethylenes which are commercially available from The Dow Chemical Company.

As used herein, the term "functionalized, chlorinated olefin-based polymer" refers to one or more of the following: (a) a chlorinated olefin-based polymer onto which anhydride (for example, maleic anhydride) and/or carboxylic acid functional groups are grafted onto the olefin based polymer; (b) an olefin-based polymer comprising one or more chlorine containing comonomers, and which is later functionalized with maleic anhydride and/or carboxylic acid functional groups; and (c) chlorinated polymers containing one or more comonomers containing carboxylic acid and/or ester groups. Grafting reactions, are described for example in U.S. Pat. Nos. 8,450,430 and 7,763,692, the disclosures of which are incorporated herein by reference. Alternatively, the functional group may be present in a copolymer (i.e., carboxylic acid functional group) which is copolymerized with the olefin monomers to form the olefin based polymer.

In one embodiment, the functionalized chlorinated olefin-based polymer is an anhydride and/or carboxylic acid functionalized, chlorinated olefin-based polymer, which is formed from a chlorinated olefin-based polymer, onto which, maleic anhydride and/or carboxylic acid functional groups are grafted onto the olefin based polymer. U.S. Pat. No. 7,763,692 discloses exemplary functionalized chlorinated olefin-based polymers.

In one embodiment, the functionalized chlorinated olefin-based polymer is an anhydride and/or carboxylic acid functionalized, chlorinated olefin-based polymer that has a chlorine content from 10 to 35 wt %, based on the total weight of the anhydride and/or carboxylic acid functionalized, chlorinated olefin-based polymer. All individual values and subranges from 10 to 35 wt % chlorine are included and disclosed herein; for example, the chlorine content can be from a lower limit of 10, 14, 18, 22, 26, 30 or 34 wt % to an upper limit of 12, 16, 20, 24, 28, 32, or 35 wt %. For example, the chlorine content can be from 10 to 35 wt %, or in the alternative, from 10 to 20 wt %, or in the alternative, from 20 to 35 wt %, or in the alternative, from 18 to 32 wt %, or in the alternative, from 15 to 30 wt %, or in the alternative. In a particular embodiment, the anhydride and/or carboxylic acid functionalized, chlorinated olefin-based polymer is a maleic anhydride grafted chlorinated polyolefin (MAH-g-CPO). In yet another specific embodiment, the anhydride and/or carboxylic acid functionalized, chlorinated olefin-based polymer is a maleic anhydride grafted chlorinated polyolefin having a maleic anhydride content of from 0.75 to 3 wt %, based on the weight of the anhydride functionalized, chlorinated olefin-based polymer. All individual values and subranges from 0.75 to 3 wt % are included and disclosed herein; for example, the maleic anhydride level can be from a lower limit of 0.75, 1, 1.5, 2, 2.5 or 2.75 wt % to an upper limit of 0.9, 1.35, 1.8, 2.25, 2.8 or 3 wt %. For example, the maleic anhydride level can be from 0.75 to 3 wt %, or in the alternative, from 0.75 to 1.75 wt %, or in the alternative, from 1.75 to 3 wt %, or in the alternative, from 1 to 2 wt %.

In one embodiment, the anhydride and/or carboxylic acid functionalized, chlorinated olefin-based polymer is a maleic anhydride grafted chlorinated polyolefin, having a weight average molecular weight, Mw, from 25,000 to 125,000 g/mole. All individual values and subranges from 25,000 to 125,000 are included and disclosed herein; for example, the Mw can be from a lower limit of 25000, 50000, 75000, or 100000 g/mole to an upper limit of 50000, 75000, 100000, or 125000. For example, the Mw can be from 25000 to 125000, or in the alternative, from 25000 to 75000, or in the alternative, from 75000 to 125000, or in the alternative, from 50000 to 100000.

The term "hydrocarbon," as used herein, refers to a chemical group containing only hydrogen and carbon atoms.

The term "hydrocarbylene," as used herein, refers to a divalent (diradical) chemical group containing only hydrogen and carbon atoms.

The term "substituted hydrocarbylene," as used herein, refers to a hydrocarbylene, in which at least one hydrogen atom is substituted with a substituent that comprises at least one heteroatom.

The term "hetero-hydrocarbylene," as used herein, refers to a hydrocarbylene, in which at least one carbon atom, or CH group, or CH2 group, is substituted with a heteroatom or a chemical group containing at least one heteroatom. Heteroatoms include, but are not limited to, O, N, P and S.

The term "substituted hetero-hydrocarbylene," as used herein, refers to a hetero-hydrocarbylene, in which at least one hydrogen atom is substituted with a substituent that comprises at least one heteroatom.

The term "hydrocarbyl," as used herein, refers to a monovalent (monoradical) chemical group containing only hydrogen and carbon atoms.

The term "substituted hydrocarbyl," as used herein, refers to a hydrocarbyl, in which at least one hydrogen atom is substituted with a substituent that comprises at least one heteroatom.

The term "hetero-hydrocarbyl," as used herein, refers to a hydrocarbyl, in which at least one carbon atom, or CH group, or CH2 group, is substituted with a heteroatom or a chemical group containing at least one heteroatom. Hetero atoms include, but are not limited to, O, N, P and S.

The term "substituted hetero-hydrocarbyl," as used herein, refers to a hetero-hydrocarbyl, in which at least one hydrogen atom is substituted with a substituent that comprises at least one heteroatom.

The instant invention is a composition comprising A) one or more monomers and/or oligomers selected from the group consisting of the following:

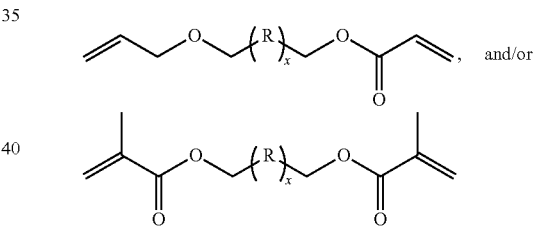

wherein each R is independently selected from the group consisting of the following; substituted or unsubstituted hydrocarbylenes, and substituted or unsubstituted hetero-hydrocarbylenes, each of the hydrocarbylenes and hetero-hydrocarbylenes having between 4 and 40 carbon atoms and x is any integer equal to or greater than 1, and further only one of the above structures;

B) at least one chlorinated olefin-based polymer and/or at least one functionalized chlorinated olefin-based polymer; and C) at least one styrene-based block copolymer or derivative thereof.

The invention also provides a composition comprising the following D)-F):

D) at least one compound selected from the following i) through v):

i) $Z^1-(CR^1R^2-O-C(O)-CR^3=CH_2)_2$ (Formula 1); wherein, for Formula 1, $Z^1$ is selected from an unsubstituted hydrocarbylene, a substituted hydrocarbylene, an unsubstituted hetero-hydrocarbylene, or a substituted hetero-hydrocarbylene; each $R^1$ is independently selected from hydrogen or an alkyl; each $R^2$ is independently selected from hydrogen or an alkyl; $R^3$ is selected from hydrogen or an alkyl;

ii) $Z^2_{(4-x)}$—C—[$CR^4R^5$—($R^6$)$_y$—O—C(O)—$CR^7$=CH$_2$]$_x$ (Formula 2), wherein for Formula 2, $Z^2$ is selected from hydrogen, an unsubstituted hydrocarbyl, a substituted hydrocarbyl, an unsubstituted hetero-hydrocarbyl, or a substituted hetero-hydrocarbyl; $R^4$ is selected from hydrogen or an alkyl; $R^5$ is selected from hydrogen or an alkyl; $R^6$ is selected from an unsubstituted hydrocarbylene, a substituted hydrocarbylene, an unsubstituted hetero-hydrocarbylene, or a substituted hetero-hydrocarbylene; y≥0; and when y=0, $R^6$ is not present; $R^7$ is selected from hydrogen or an alkyl; and x is from 1 to 4; and when x=4, $Z^2$ is not present;

iii) $Z^3_{(3-x)}$—$CR^8$—[$CR^9R^{10}$—($R^{11}$)$_y$—O—C(O)—$CR^{12}$=CH$_2$]$_x$ (Formula 3), wherein for Formula 3, $Z^3$ is selected from hydrogen, an unsubstituted hydrocarbyl, a substituted hydrocarbyl, an unsubstituted hetero-hydrocarbyl, or a substituted hetero-hydrocarbyl; $R^8$ is -(T-O—C(O)—CR=CH2) where R is hydrogen or alkyl, and T is selected from an unsubstituted hydrocarbylene, a substituted hydrocarbylene, an unsubstituted hetero-hydrocarbylene, or a substituted hetero-hydrocarbylene; $R^9$ is selected from hydrogen or an alkyl; $R^{10}$ is selected from hydrogen or an alkyl; $R^{11}$ is selected from an unsubstituted hydrocarbylene, a substituted hydrocarbylene, an unsubstituted hetero-hydrocarbylene, or a substituted hetero-hydrocarbylene; y≥0; and when y=0, $R^{11}$ is not present; $R^{12}$ is selected from hydrogen or an alkyl; and x is from 1 to 3; and when x=3, $Z^3$ is not present;

iv) O—{[$CR^{13}R^{14}$—C($Z^4_{(3-x)}$)—[$CR^{15}R^{16}$—($R^{17}$)$_y$—O—C(O)—$CR^{18}$=CH$_2$]$_x$}$_2$ (Formula 4), wherein for Formula 4, $Z^4$ is selected from hydrogen, an unsubstituted hydrocarbyl, a substituted hydrocarbyl, an unsubstituted hetero-hydrocarbyl, or a substituted hetero-hydrocarbyl; $R^{13}$ is selected from hydrogen or an alkyl; $R^{14}$ is selected from hydrogen or an alkyl; $R^{15}$ is selected from hydrogen or an alkyl; $R^{16}$ is selected from hydrogen or an alkyl; $R^{17}$ is selected from an unsubstituted hydrocarbylene, a substituted hydrocarbylene, an unsubstituted hetero-hydrocarbylene, or a substituted hetero-hydrocarbylene; y≥0, and when y=0, $R^{17}$ is not present; $R^{18}$ is selected from hydrogen or an alkyl; and x is from 1 to 3; and when x=3, $Z^4$ is not present;

v) a combination of two or more from Formulas 1 through 4 above;

E) at least one chlorinated olefin-based polymer and/or at least one functionalized chlorinated olefin-based polymer; and F) at least one styrene-based block copolymer or derivative thereof In an alternative embodiment, the instant invention provides an article of manufacture comprising at least one component which comprises the composition according to any of the embodiments disclosed herein.

Component A) and Component D)

Component A) is one or more monomers and/or oligomers selected from the group consisting of the following:

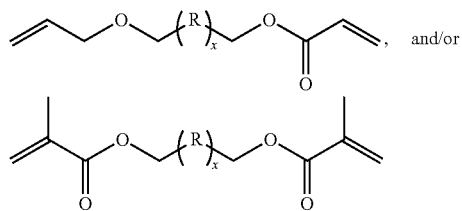

wherein each R is independently selected from the group consisting of hydrocarbylenes and hetero-hydrocarbylenes, each of the hydrocarbylenes and hetero-hydrocarbylenes having between 4 and 40 carbon atoms and x is any integer equal to or greater than 1. In a further embodiment, Component A is selected from one of the structures above.

The invention also provides a composition comprising the following compounds of Component D:

i) $Z^1$—($CR^1R^2$—O—C(O)—$CR^3$=CH$_2$)$_2$ (Formula 1); wherein, for Formula 1, $Z^1$ is selected from an unsubstituted hydrocarbylene, a substituted hydrocarbylene, an unsubstituted hetero-hydrocarbylene, or a substituted hetero-hydrocarbylene; each $R^1$ is independently selected from hydrogen or an alkyl; each $R^2$ is independently selected from hydrogen or an alkyl; $R^3$ is selected from hydrogen or an alkyl;

ii) $Z^2_{(4-x)}$—C—[$CR^4R^5$—($R^6$)$_y$—O—C(O)—$CR^7$=CH$_2$]$_x$ (Formula 2), wherein for Formula 2, $Z^2$ is selected from hydrogen, an unsubstituted hydrocarbyl, a substituted hydrocarbyl, an unsubstituted hetero-hydrocarbyl, or a substituted hetero-hydrocarbyl; $R^4$ is selected from hydrogen or an alkyl; $R^5$ is selected from hydrogen or an alkyl; $R^6$ is selected from an unsubstituted hydrocarbylene, a substituted hydrocarbylene, an unsubstituted hetero-hydrocarbylene, or a substituted hetero-hydrocarbylene; y≥0; and when y=0, $R^6$ is not present; $R^7$ is selected from hydrogen or an alkyl; and x is from 1 to 4; and when x=4, $Z^2$ is not present;

iii) $Z^3_{(3-x)}$—$CR^8$—[$CR^9R^{10}$—($R^{11}$)$_y$—O—C(O)—$CR^{12}$=CH$_2$]$_x$ (Formula 3), wherein for Formula 3, $Z^3$ is selected from hydrogen, an unsubstituted hydrocarbyl, a substituted hydrocarbyl, an unsubstituted hetero-hydrocarbyl, or a substituted hetero-hydrocarbyl; $R^8$ is -(T-O—C(O)—CR=CH2) where R is hydrogen or alkyl, and T is selected from an unsubstituted hydrocarbylene, a substituted hydrocarbylene, an unsubstituted hetero-hydrocarbylene, or a substituted hetero-hydrocarbylene; $R^9$ is selected from hydrogen or an alkyl; $R^{10}$ is selected from hydrogen or an alkyl; $R^{11}$ is selected from an unsubstituted hydrocarbylene, a substituted hydrocarbylene, an unsubstituted hetero-hydrocarbylene, or a substituted hetero-hydrocarbylene; y≥0; and when y=0, $R^{11}$ is not present; $R^{12}$ is selected from hydrogen or an alkyl; and x is from 1 to 3; and when x=3, $Z^3$ is not present;

iv) O—{[$CR^{13}R^{14}$—C($Z^4_{(3-x)}$)—[$CR^{15}R^{16}$—($R^{17}$)$_y$—O—C(O)—$CR^{18}$=CH$_2$]$_x$}$_2$ (Formula 4), wherein for Formula 4, $Z^4$ is selected from hydrogen, an unsubstituted hydrocarbyl, a substituted hydrocarbyl, an unsubstituted hetero-hydrocarbyl, or a substituted hetero-hydrocarbyl; $R^{13}$ is selected from hydrogen or an alkyl; $R^{14}$ is selected from hydrogen or an alkyl; $R^{15}$ is selected from hydrogen or an alkyl; $R^{16}$ is selected from hydrogen or an alkyl; $R^{17}$ is selected from an unsubstituted hydrocarbylene, a substituted hydrocarbylene, an unsubstituted hetero-hydrocarbylene, or a substituted hetero-hydrocarbylene; y≥0, and when y=0, $R^{17}$ is not present; $R^{18}$ is selected from hydrogen or an alkyl; and x is from 1 to 3; and when x=3, $Z^4$ is not present;

v) a combination of two or more from Formulas 1 through 4 above;

In one embodiment, for Formula 1, $Z^1$ is selected from the following: —CHR—O—CHR—, wherein each R is independently H or alkyl; —CHR—O—CHRCHR—O—CHR—, wherein each R is independently H or alkyl; or —(CHR)n-, wherein R is H or alkyl, and n≥1;

For Formula 2, $Z^2$ is selected from an unsubstituted hydrocarbyl; $R^6$ is selected from an unsubstituted hydrocarbylene, or an unsubstituted hetero-hydrocarbylene;

for Formula 3, $Z^3$ is selected from hydrogen or an unsubstituted hydrocarbyl; $R^{11}$ is selected from an unsubstituted hydrocarbylene, or an unsubstituted hetero-hydrocarbylene;

for Formula 4, $Z^4$ is selected from an unsubstituted hydrocarbyl; $R^{17}$ is selected from an unsubstituted hydrocarbylene, or an unsubstituted hetero-hydrocarbylene.

In one embodiment, Component A or Component D is selected from the following: (a) through (l);

(a)
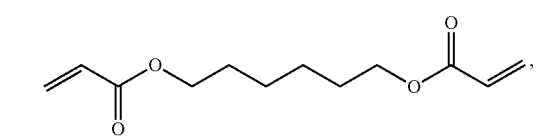

(b)
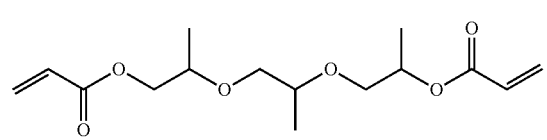

(c)
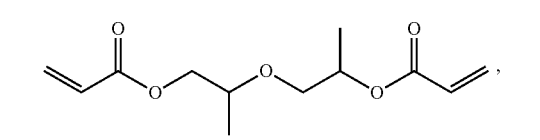

(d)
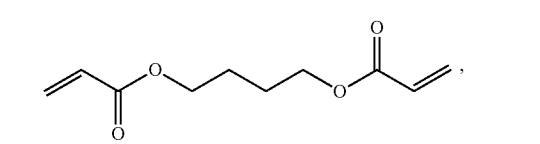

(e)
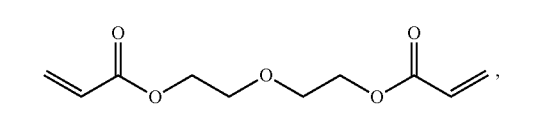

(f)
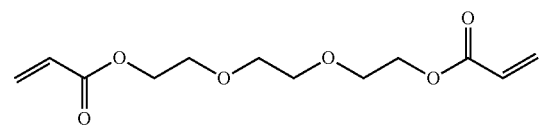

(g)
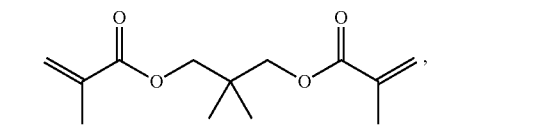

(h)
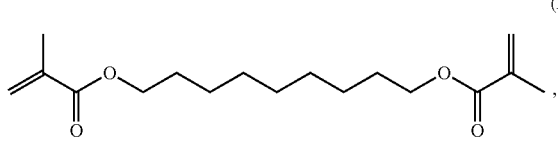

(i)
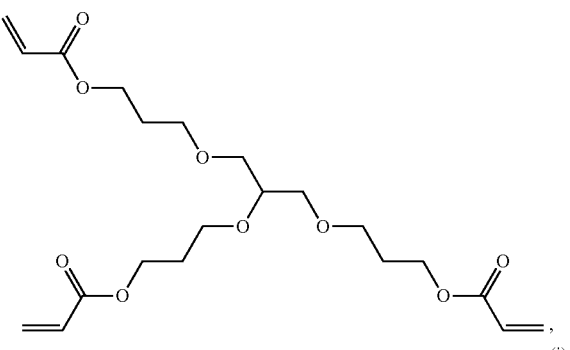

(j)
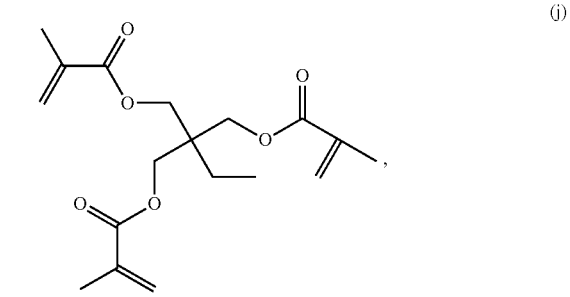

(k)
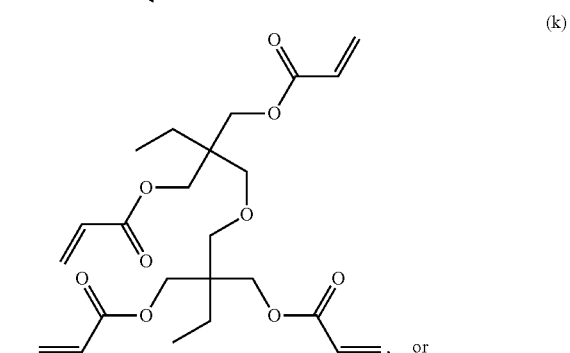

, or (l)
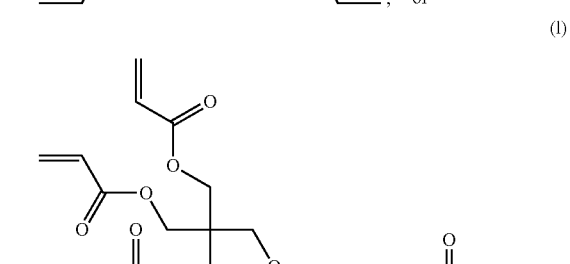

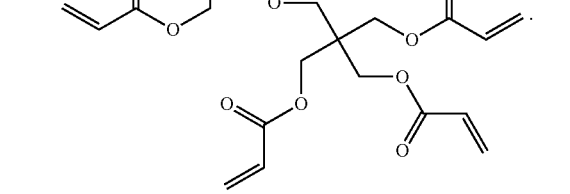

In one embodiment, the at least one compound of component D) is selected from the group consisting of the following: 1,6 Hexanediol diacrylate (HDDA), tri propylene glycol diacrylate (TPGDA); dipropylene glycol diacrylate (DPGDA) and 1,4-butandiol diacrylate (BDDA).

In one embodiment, the at least one compound of component D) is selected from the group consisting of the following: Diethylene glycol diacrylate; Triethylene glycol diacrylate; Neopentyl glycol diacrylate (NPGDA); and NonanediolDiacrylate (NDDA).

In one embodiment, the at least one compound of component D) is selected from the group consisting of the following: Glycerylpropoxy Triacrylate (GPTA); Trimethylolpropane Trimethacrylate (TMPTMA); Di-Trimethylolpropane Tetraacrylate (Di-TMPTA); and Di-pentaerythritol hexa acrylate (DPHA).

Examples of component D include 1,6-hexanediol dimethacrylate (HDDA) (having the structure shown in Formula 1) and tripropylene glycol diacrylate (TPGDA) (having the structure shown in Formula 2). In one embodiment, the component is HDDA. In an alternative embodiment, the component is TPGDA.

Formula 1a

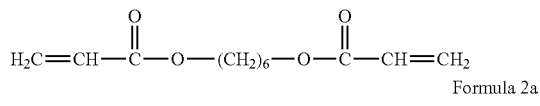

Formula 2a

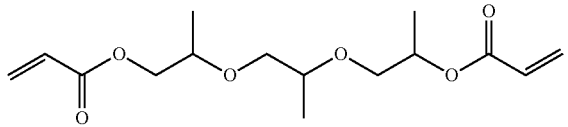

In one embodiment, component D) comprises 1,6-hexanediol dimethacrylate (HDDA).

In on embodiment, component D) comprises tripropylene glycol diacrylate (TPGDA).

Formulas 1-4 of Component D

In one embodiment, component D) is selected from the following: $Z^1$—$(CR^1R^2$—O—C(O)—$CR^3$=$CH_2)_2$ (Formula 1); wherein, for Formula 1, $Z^1$ is selected from an unsubstituted hydrocarbylene, a substituted hydrocarbylene, an unsubstituted hetero-hydrocarbylene, or a substituted hetero-hydrocarbylene; each $R^1$ is independently selected from hydrogen or an alkyl; each $R^2$ is independently selected from hydrogen or an alkyl; $R^3$ is selected from hydrogen or an alkyl.

In one embodiment, for Formula 1, $Z^1$ is selected from the following: an unsubstituted hydrocarbylene or an unsubstituted hetero-hydrocarbylene.

In one embodiment, for Formula 1, $Z^1$ is selected from the following: a) —$(CR^aR^b)n$-, where $R^a$ is hydrogen or an alkyl, $R^b$ is hydrogen or an alkyl, and n≥1, further n=1 to 20, further n=1 to 10; b) —$CR^cR^d$—O—$CR^eR^f$—O—$CR^gR^h$—, where $R^c$ is hydrogen or an alkyl, $R^d$ is hydrogen or an alkyl, $R^e$ is hydrogen or an alkyl, $R^f$ is hydrogen or an alkyl, $R^g$ is hydrogen or an alkyl, and $R^h$ is hydrogen or an alkyl; c) —$CR^iR^j$—O—$CR^kR^l$—, where $R^i$ is hydrogen or an alkyl, $R^j$ is hydrogen or an alkyl, $R^k$ is hydrogen or an alkyl, and $R^l$ is hydrogen or an alkyl.

In one embodiment, for Formula 1, $Z^1$ is selected from the following: a) —CHR—O—CHR—, wherein each R is independently H or alkyl; b) —CHR—O—CHRCHR—O—CHR—, wherein each R is independently H or alkyl; or c) —$(CHR)_n$—, wherein R is H or alkyl, and n≥1, further n=1 to 20, further n=1 to 10.

In one embodiment, component D) is selected from the following: $Z^2_{(4-x)}$—C—$[CR^4R^5$—$(R^6)_y$—O—C(O)—$CR^7$=$CH_2]_x$ (Formula 2), wherein for Formula 2, $Z^2$ is selected from hydrogen, an unsubstituted hydrocarbyl, a substituted hydrocarbyl, an unsubstituted hetero-hydrocarbyl, or a substituted hetero-hydrocarbyl; $R^4$ is selected from hydrogen or an alkyl; $R^5$ is selected from hydrogen or an alkyl; $R^6$ is selected from an unsubstituted hydrocarbylene, a substituted hydrocarbylene, an unsubstituted hetero-hydrocarbylene, or a substituted hetero-hydrocarbylene; y≥0; and when y=0, $R^6$ is not present; $R^7$ is selected from hydrogen or an alkyl; and x is from 1 to 4; and when x=4, $Z^2$ is not present.

In one embodiment, the compound of component D is selected from: $H_2C$=CH—C(O)—O—$CH_2$—$(R)_x$—$CH_2$—O—C(O)—CH=$CH_2$, where R is selected from an unsubstituted hydrocarbylene, a substituted hydrocarbylene, an unsubstituted hetero-hydrocarbylene, or a substituted hetero-hydrocarbylene, and x≥1.

In one embodiment, for Formula 2, Formula 2, $Z^2$ is selected from hydrogen or an unsubstituted hydrocarbyl; $R^6$ is selected from an unsubstituted hydrocarbylene, or an unsubstituted hetero-hydrocarbylene. In a further embodiment, x=3.

In one embodiment, for Formula 2, Formula 2, $Z^2$ is selected from hydrogen or an alkyl; $R^6$ is selected from the following: a) —$(CR^aR^b)n$-, wherein $R^a$ is hydrogen or an alkyl, $R^b$ is hydrogen or an alkyl, and n≥0, further n=1 to 20, further n=1 to 10, or b) —$(CR^cR^d)n$-O—, wherein $R^c$ is hydrogen or an alkyl, $R^d$ is hydrogen or an alkyl, and n≥0, further n=1 to 20, further n=1 to 10. In a further embodiment, x=3.

In one embodiment, component D) is selected from the following: $Z^3_{(3-x)}$—$CR^8$—$[CR^9R^{510}$—$(R^{11})_y$—O—C(O)—$CR^{12}$=$CH_2]_x$ (Formula 3), wherein for Formula 3, $Z^3$ is selected from hydrogen, an unsubstituted hydrocarbyl, a substituted hydrocarbyl, an unsubstituted hetero-hydrocarbyl, or a substituted hetero-hydrocarbyl; $R^8$ is -(T-O—C(O)—CR=CH2) where R is hydrogen or alkyl, and T is selected from an unsubstituted hydrocarbylene, a substituted hydrocarbylene, an unsubstituted hetero-hydrocarbylene, or a substituted hetero-hydrocarbylene; $R^9$ is selected from hydrogen or an alkyl; $R^{10}$ is selected from hydrogen or an alkyl; is selected from an unsubstituted hydrocarbylene, a substituted hydrocarbylene, an unsubstituted hetero-hydrocarbylene, or a substituted hetero-hydrocarbylene; y≥0; and when y=0, $R^{11}$ is not present; $R^{12}$ is selected from hydrogen or an alkyl; and x is from 1 to 3; and when x=3, $Z^3$ is not present.

In one embodiment, for Formula 3, $Z^3$ is selected from hydrogen or an unsubstituted hydrocarbyl; $R^{11}$ is selected from an unsubstituted hydrocarbylene, or an unsubstituted hetero-hydrocarbylene. In a further embodiment, x=2.

In one embodiment, Formula 3, $Z^3$ is selected from hydrogen or an unsubstituted hydrocarbyl; $R^8$ is -(T-O—C(O)—CR=CH2) where R is hydrogen or alkyl, and T is selected from an unsubstituted hydrocarbylene, or an unsubstituted hetero-hydrocarbylene, $R^{11}$ is selected from an unsubstituted hydrocarbylene, or an unsubstituted hetero-hydrocarbylene. In a further embodiment, x=2.

In one embodiment, for Formula 3, $Z^3$ is selected from hydrogen or an alkyl; $R^8$ is -(T-O—C(O)—CR=CH2) where R is hydrogen or alkyl, and T is selected from the following: a) —$(CR^aR^b)n$-, wherein $R^a$ is hydrogen or an alkyl, $R^b$ is hydrogen or an alkyl, and n≥0, further n=1 to 20, further n=1 to 10, or b) —$(CR^cR^d)n$-O—, wherein $R^c$ is hydrogen or an alkyl, $R^d$ is hydrogen or an alkyl, and n≥0, further n=1 to 20, further n=1 to 10; is selected from the following a) —$(CR^eR^f)n$-, wherein $R^e$ is hydrogen or an alkyl, $R^f$ is hydrogen or an alkyl, and n≥0, further n=1 to 20, further n=1 to 10, or b) —$(CR^gR^h)n$-O—, wherein $R^g$ is hydrogen or an alkyl, $R^h$ is hydrogen or an alkyl, and n≥0, further n=1 to 20, further n=1 to 10. In a further embodiment, x=2.

In one embodiment, component D) is selected from the following: O—{CR$^{13}$R$^{14}$—C(Z$^4_{(3-x)}$)—[CR$^{15}$R$^{16}$—(R$^{17}$)$_y$—O—C(O)—CR$^{18}$=CH$_2$)]$_x$}$_2$ (Formula 4), wherein for Formula 4, $Z^4$ is selected from hydrogen, an unsubstituted hydrocarbyl, a substituted hydrocarbyl, an unsubstituted hetero-hydrocarbyl, or a substituted hetero-hydrocarbyl; $R^{13}$ is selected from hydrogen or an alkyl; $R1^4$ is selected from hydrogen or an alkyl; $R^{15}$ is selected from hydrogen or an alkyl; $R^{16}$ is selected from hydrogen or an alkyl; $R^{17}$ is selected from an unsubstituted hydrocarbylene, a substituted hydrocarbylene, an unsubstituted hetero-hydrocarbylene, or a substituted hetero-hydrocarbylene; y≥0, and when y=0, $R^{17}$ is not present; $R^{18}$ is selected from hydrogen or an alkyl; and x is from 1 to 3; and when x=3, $Z^4$ is not present.

In one embodiment, for Formula 4, $Z^4$ is selected from an unsubstituted hydrocarbyl; is selected from an unsubstituted hydrocarbylene, or an unsubstituted hetero-hydrocarbylene. In a further embodiment, x=2 or 3.

In one embodiment, for Formula 4, $Z^4$ is selected from an unsubstituted hydrocarbyl; and y=0. In a further embodiment, x=2 or 3.

Component C) or Component F): Styrene-Based Block Copolymers or Derivatives Thereof Examples of styrenic block copolymers suitable for the invention are described in EP 0 712 892 B1, WO 2004/041538 A1, U.S. Pat. No. 6,582,829B1, US2004/0087235 A1, US2004/0122408 A1, US2004/0122409A1, and U.S. Pat. Nos. 4,789,699, 5,093,422 and 5,332,613, the disclosures of which are incorporated herein by reference. Some styrene-based block copolymers or derivatives thereof are described below.

In general, hydrogenated styrenic block copolymers suitable for the invention have at least two mono-alkenyl arene blocks, preferably two polystyrene blocks, separated by a block of saturated conjugated diene comprising less than 20% residual ethylenic unsaturation, preferably a saturated polybutadiene block. The preferred styrenic block copolymers have a linear structure although in some embodiments, branched or radial polymers or functionalized block copolymers make useful compounds (amine-functionalized styrenic block copolymers are generally disfavored in the manufacture of the artificial leather of this invention).

Typically, polystyrene-saturated polybutadiene-polystyrene and polystyrene-saturated polyisoprene-polystyrene block copolymers comprise polystyrene end-blocks having a number average molecular weight from 5,000 to 35,000 and saturated polybutadiene or saturated polyisoprene mid-blocks having a number average molecular weight from 20,000 to 170,000. The saturated polybutadiene blocks preferably have from 35-55% 1,2-configuration and the saturated polyisoprene blocks preferably have greater than 85% 1,4-configuration.

The total number average molecular weight of the styrenic block copolymer is preferably from 30,000 to 250,000 if the copolymer has a linear structure. Such block copolymers typically have an average polystyrene content from 10% by weight to 30%, more typically from 10% by weight to 20% by weight.

SEBS (S is styrene, E is ethylene and B is butylene) and SEPS (P is propylene) block copolymers useful in certain embodiments of the present invention are available from each of Kraton Polymers, Asahi Kasei and Kuraray America.

In one embodiment, the at least one styrene-based block copolymer or derivative thereof, component C) or component F), is selected from the group consisting of the following: styrene-ethylene/butylene-styrene block copolymer (SEBS), styrene/butadiene/styrene block copolymer (SBS), and maleic anhydride grafted styrene-ethylene/butylene-styrene block copolymer (SEBS-g-MAH).

Component B) or Component E): Chlorinated Olefin-Based Polymer or Functionalized Chlorinated Olefin-Based Polymer In one embodiment, the at least one chlorinated olefin-based polymer of component B) or component E), is selected from the group consisting of chlorinated olefin-based polymers that have a chlorine content from 10 to 40 wt %, based on the weight of the chlorinated olefin-based polymer.

In one embodiment, the at least one chlorinated olefin-based polymer of component B) or component E), is selected from the group consisting of functionalized chlorinated olefin-based polymers that have a chlorine content from 10 to 40 wt %, based on the weight of the chlorinated olefin-based polymer. In a further embodiment, the functionalized chlorinated olefin-based polymer is anhydride and/or carboxylic functionalized chlorinated olefin-based polymer.

In one embodiment, the composition is formed using an anhydride and/or carboxylic acid functionalized, chlorinated olefin-based polymer that has a chlorine content from 10 to 40 wt %, based on the total weight of the anhydride and/or carboxylic acid functionalized, chlorinated olefin-based polymer. All individual values and subranges from 10 to 40 wt % chlorine are included and disclosed herein; for example, the chlorine content can be from a lower limit of 10, 14, 18, 22, 26, 30 or 34 wt % to an upper limit of 12, 16, 20, 24, 28, 32, 35 or 40 wt %. For example, the chlorine content can be from 10 to 40 wt %, or in the alternative, from 10 to 20 wt %, or in the alternative, from 20 to 40 wt %, or in the alternative, from 18 to 32 wt %, or in the alternative, from 15 to 30 wt %, or in the alternative. In a particular embodiment, the anhydride and/or carboxylic acid functionalized, chlorinated olefin-based polymer is a maleic anhydride grafted chlorinated polyolefin. In yet another specific embodiment, the anhydride and/or carboxylic acid functionalized, chlorinated olefin-based polymer is a maleic anhydride grafted chlorinated polyolefin having a maleic anhydride content of from 0.75 to 3 wt %, based on the weight of the anhydride functionalized, chlorinated olefin-based polymer. All individual values and subranges from 0.75 to 3 wt % are included and disclosed herein; for example, the maleic anhydride level can be from a lower limit of 0.75, 1, 1.5, 2, 2.5 or 2.75 wt % to an upper limit of 0.9, 1.35, 1.8, 2.25, 2.8 or 3 wt %. For example, the maleic anhydride level can be from 0.75 to 3 wt %, or in the alternative, from 0.75 to 1.75 wt %, or in the alternative, from 1.75 to 3 wt %, or in the alternative, from 1 to 2 wt %. In another embodiment, the anhydride and/or carboxylic acid functionalized, chlorinated olefin-based polymer is a maleic anhydride grafted chlorinated polyolefin (or maleic anhydride grafted chlorinated olefin-based polymer) having a weight average molecular weight, Mw, from 25,000 to 125,000 g/mole. All individual values and subranges from 25,000 to 125,000 are included and disclosed herein; for example, the Mw can be from a lower limit of 25000, 50000, 75000, or 100000 g/mole to an upper limit of 50000, 75000, 100000, or 125000. For example, the Mw can be from 25000 to 125000, or in the alternative, from 25000 to 75000, or in the alternative, from 75000 to 125000, or in the alternative, from 50000 to 100000.

Exemplary component B) or component E) species include maleic anhydride grafted chlorinated polyolefins (or maleic anhydride grafted chlorinated olefin-based polymer; for example a maleic anhydride grafted chlorinated ethylene-based polymer or a maleic anhydride grafted chlorinated propylene-based polymer).

Component G): Photoinitiator

In one embodiment, an inventive composition further comprises G) at least one photoinitiator.

Photoinitiators, a/k/a photopolymerization initiators, photoreaction initiators, and the like, are known in the art. Exemplary photoinitiators include benzoin methyl ether, benzoin ethyl ether, benzoin isobutyl ether, benzoin isopropyl ether, benzoin, .alpha.-methylbenzoin, benzoin n-butyl ether, 2-ethylanthraquinone, 2-tert-butylanthraquinone, 1-chloroanthraquinone, 2-amylanthraquinone, 2-aminoanthraquinone, benzophenone, p-chlorobenzophenone, p-dimethylaminobenzophenone, benzophenone methyl ether, methylbenzophenone, 4,4-dichlorobenzophenone, 4,4-bis-diethylaminobenzophenone, diphenyl sulfide, tetramethylthiuram disulfide, 2,4-dimethylthioxanthone, 2,4-diisopropylthioxanthone, 2,4-diethylthioxanthone, 2-chlorothioxanthone, 2-isopropylthioxanthone, 2,2-dimethoxy-2-phenylacetophenone, .alpha.,.alpha.-dichloro-4-phenoxyacetone, p-tert-butyltrichloroacetophenone, p-tert-butyldichloroacetophenone, 2,2-diethoxyacetophenone, p-dimethylaminoacetophenone, hydroxycyclohexyl phenyl ketone, 1-(4-isopropylphenyl)-2-hydroxy-2-methylpropane-1-one, 2,2-dimethoxy-1,2-diphenylethane-1-one, 2,4,6-trimethylbenzoin diphenylphosphine oxide, 2-methyl-1-[4-(methylthio)phenyl]-2-morpholinopropane-1-one, 4-(2-acryloxy)oxyethoxy-phenyl 2-hydroxy-2-propyl ketone, 4-(2-hydroxy)phenyl-(2-hydroxy-2-propyl) ketone, bis(2,6-dimethoxybenzoyl)-2,4,4-trimethylphenylphosphine oxide, etc. Among these, benzophenone, 2-ethylanthraquinone, 2,4-dimethylthioxanthone, 2,4-diisopropylthioxanthone, 2,4-diethylthioxanthone, 2-chlorothioxanthone, 2-isopropylthioxanthone, hydroxycyclohexyl phenyl ketone, 1-(4-isopropylphenyl)-2-hydroxy-2-methylpropane-1-one and 2,2-dimethoxy-1,2-diphenylethane-1-one are preferred because of good curability, adhesion and heat resistance. In the practice of the invention, one or two or more of them can be used singly or in combination in the under coating.

Component H): Solvent

In one embodiment, an inventive composition further comprises H) one or more non-aromatic and nonchlorinated organic solvents.

Any non-aromatic and non-chlorinated solvent may be used in some embodiments of the inventive composition. Exemplary non-aromatic and non-chlorinated solvents include heptane, methyl cyclohexane (MCH), ethyl cyclohexane, cyclohexane, cyclohexanone, methyl ethyl ketone (MEK), ethyl acetate (EA), butyl acetate (BA), and any combination of two or more thereof. In a particular embodiment, the solvent is selected from the group consisting of MCH and heptane.

In one embodiment, the composition comprises from 0.1 to 10 wt % combined amount of components A), B), C) and G) and from 99.9 to 90 wt % of the one or more non-aromatic and nonchlorinated organic solvents; each wt % based on the weight of the composition; or wherein the composition comprises from 0.1 to 10 wt % combined amount of components D), E), F) and G) and from 99.9 to 90 wt % of the one or more non-aromatic and nonchlorinated organic solvents; each wt % based on the weight of the composition.

In one embodiment, the composition comprises from 0.1 to 90 wt % component A), from 1 to 90 wt % component B), from 1 to 90 wt % component C) and from 0.1 to 10 wt % component G), each based on the total weight of components A), B), C) and G) combined; or wherein the composition comprises from 0.1 to 90 wt % component D), from 1 to 90 wt % component E), from 1 to 90 wt % component F) and from 0.1 to 10 wt % component G), each based on the total weight of components D), E), F) and G) combined.

Specific Embodiments

In one embodiment, the invention provides the composition and article of manufacture in accordance with any of the embodiments disclosed herein except that the composition further comprises G) at least one photoinitiator.

In one embodiment, the invention provides the composition and article of manufacture in accordance with any of the embodiments disclosed herein except that the composition further comprises H) one or more non-aromatic and non-chlorinated organic solvents.

In one embodiment, the invention provides the composition and article of manufacture in accordance with any of the embodiments disclosed herein except that the one or more monomers and/or oligomers, component A), comprises 1,6-hexanediol dimethacrylate (HDDA).

In one embodiment, the invention provides the composition and article of manufacture in accordance with any of the embodiments disclosed herein except that the one or more monomers and/or oligomers, component A), comprises tripropylene glycol diacrylate (TPGDA).

In one embodiment, the invention provides the composition and article of manufacture in accordance with any of the embodiments disclosed herein except that the chlorinated olefin-based polymer is a chlorinated ethylene-based polymer.

In one embodiment, the invention provides the composition and article of manufacture in accordance with any of the embodiments disclosed herein except that the chlorinated olefin-based polymer is a chlorinated propylene-based polymer.

In one embodiment, the invention provides the composition and article of manufacture in accordance with any of the embodiments disclosed herein except that the functionalized chlorinated olefin-based polymer is a functionalized chlorinated ethylene-based polymer.

In one embodiment, the invention provides the composition and article of manufacture in accordance with any of the embodiments disclosed herein except that the functionalized chlorinated olefin-based polymer is a functionalized chlorinated propylene-based polymer.

In one embodiment, the invention provides the composition and article of manufacture in accordance with any of the embodiments disclosed herein except that the one or more one or more styrene-based block copolymer or derivative thereof, component C), is selected from the group consisting of styrene-ethylene/butylene-styrene block copolymer (SEBS), styrene/butadiene/styrene block copolymer (SBS), and maleic anhydride grafted styrene-ethylene/butylene-styrene block copolymer (SEBS-g-MAH).

In one embodiment, the invention provides the composition and article of manufacture in accordance with any of the embodiments disclosed herein except that the one or more one or more styrene-based block copolymer or derivative thereof, component F), is selected from the group consisting of styrene-ethylene/butylene-styrene block copolymer (SEBS), styrene/butadiene/styrene block copolymer (SBS), and maleic anhydride grafted styrene-ethylene/butylene-styrene block copolymer (SEBS-g-MAH).

In one embodiment, the invention provides the composition and article of manufacture in accordance with any of the embodiments disclosed herein except that the composition comprises from 0.1~10 wt % combined amount of components A), B), C) and G) and from 99.9 to 90 wt % of the one or more non-aromatic and nonchlorinated organic solvents. All individual values and subranges of the foregoing weight percentage ranges are included and disclosed herein. For example the combined amount of components A), B), C) and G) can range from a lower limit of 0.1, 0.5, 1, 2, 4, 6, or 8 wt % to an upper limit of 0.2, 0.7, 1.5, 3, 5, 7, 9 or 10 wt %. For example, the combined amount of components A), B), C) and G) can be from 0.1 to 10 wt %, or in the alternative, from 0.1 to 5 wt %, or in the alternative, from 5 to 10 wt %, or in the alternative, from 2 to 8 wt %, or in the alternative, from 3 to 7 wt %. Likewise, the amount of component H), the one or more non-aromatic and nonchlorinated organic solvent can range from a lower limit of 90, 92, 94, 96 or 98 wt % to an upper limit of 91, 93, 95, 97, 99, 99.5 or 99.9 wt %. For example, the weight of the solvent can be from 90 to 99.9 wt %, or in the alternative from 95 to 99.9 wt %, or in the alternative, from 93 to 97 wt %, or in the alternative, from 92 to 98 wt %.

In one embodiment, the invention provides the composition and article of manufacture in accordance with any of the embodiments disclosed herein except that the composition comprises from 0.1~10 wt % combined amount of components D), E), F) and G) and from 99.9 to 90 wt % of the one or more non-aromatic and nonchlorinated organic solvents. All individual values and subranges of the foregoing weight percentage ranges are included and disclosed herein. For example the combined amount of components D), E), F) and G) can range from a lower limit of 0.1, 0.5, 1, 2, 4, 6, or 8 wt % to an upper limit of 0.2, 0.7, 1.5, 3, 5, 7, 9 or 10 wt %. For example, the combined amount of components D), E), F) and G) can be from 0.1 to 10 wt %, or in the alternative, from 0.1 to 5 wt %, or in the alternative, from 5 to 10 wt %, or in the alternative, from 2 to 8 wt %, or in the alternative, from 3 to 7 wt %. Likewise, the amount of component E), the one or more non-aromatic and nonchlorinated organic solvent can range from a lower limit of 90, 92, 94, 96 or 98 wt % to an upper limit of 91, 93, 95, 97, 99, 99.5 or 99.9 wt %. For example, the weight of the solvent can be from 90 to 99.9 wt %, or in the alternative from 95 to 99.9 wt %, or in the alternative, from 93 to 97 wt %, or in the alternative, from 92 to 98 wt %.

In one embodiment, embodiment, the invention provides the composition and article of manufacture in accordance with any of the embodiments disclosed herein except that the composition comprises from 0.1 to 90 wt % component A), from 1 to 90 wt % component B), from 1 to 90 wt % component C) and from 0.1 to 10 wt % component G), each based on the total weight of components A), B), C) and G) combined. All individual values and subranges of the foregoing weight percentage ranges are included and disclosed herein. For example, the amount of component A) based on the total weight of components A), B), C) and G) combined can range from a lower limit of 0.1, 1, 10, 20, 30, 40, 50, 60, 70, or 80 wt % to an upper limit of 0.5, 1.5, 15, 25, 35, 45, 55, 65, 75, 85 or 90 wt %. For example, the amount of component A) based on the total weight of components A), B), C) and G) combined can be from 0.1 to 90 wt %, or in the alternative, from 50 to 90 wt %, or in the alternative, from 0.1 to 50 wt %, or in the alternative, from 25 to 75 wt %. The amount of component B) can range from a lower limit of 1, 10, 20, 30, 40, 50, 60, 70, or 80 wt % to an upper limit of 5, 15, 25, 355, 45, 55, 65, 75, 85 or 90 wt %. For example, the amount of component B) can be from 1 to 90 wt %, or in the alternative, from 45 to 90 wt %, or in the alternative, from 1 to 55 wt %, or in the alternative, from 25 to 75 wt %, or in the alternative, from 30 to 70 wt %. The amount of component C) based on the total weight of components A), B), C) and G) combined can range from a lower limit of 1, 10, 20, 30, 40, 50, 60, 70, or 80 wt % to an upper limit of 5, 15, 25, 355, 45, 55, 65, 75, 85 or 90 wt %. For example, the amount of component C) can be from 1 to 90 wt %, or in the alternative, from 45 to 90 wt %, or in the alternative, from 1 to 55 wt %, or in the alternative, from 25 to 75 wt %, or in the alternative, from 30 to 70 wt %. The amount of component G) based on the total weight of components A), B), C) and G) combined can range from a lower limit of 0.1, 0.5, 1, 3, 5, 7 or 9 wt % to an upper limit of 0.2, 0.7, 2, 4, 6, 8 or 10 wt %. For example, the amount of component G) can be from 0.1 to 10 wt %, or in the alternative, from 0.1 to 5 wt %, or in the alternative, from 4 to 10 wt %, or in the alternative, from 2 to 8 wt %, or in the alternative, from 0.5 to 2.5 wt %.

In one embodiment, the invention provides the composition and article of manufacture in accordance with any of the embodiments disclosed herein except that the composition comprises from 0.1 to 90 wt % component D), from 1 to 90 wt % component E), from 1 to 90 wt % component F) and from 0.1 to 10 wt % component G), each based on the total weight of components D), E), F) and G) combined. All individual values and subranges of the foregoing weight percentage ranges are included and disclosed herein. For example, the amount of component D) based on the total weight of components D), E), F) and G) combined can range from a lower limit of 0.1, 1, 10, 20, 30, 40, 50, 60, 70, or 80 wt % to an upper limit of 0.5, 1.5, 15, 25, 35, 45, 55, 65, 75, 85 or 90 wt %. For example, the amount of component D) based on the total weight of components D), E), F) and G) combined can be from 0.1 to 90 wt %, or in the alternative, from 50 to 90 wt %, or in the alternative, from 0.1 to 50 wt %, or in the alternative, from 25 to 75 wt %. The amount of component E) can range from a lower limit of 1, 10, 20, 30, 40, 50, 60, 70, or 80 wt % to an upper limit of 5, 15, 25, 355, 45, 55, 65, 75, 85 or 90 wt %. For example, the amount of component E) can be from 1 to 90 wt %, or in the alternative, from 45 to 90 wt %, or in the alternative, from 1 to 55 wt %, or in the alternative, from 25 to 75 wt %, or in the alternative, from 30 to 70 wt %. The amount of component F) based on the total weight of components D), E), F) and G) combined can range from a lower limit of 1, 10, 20, 30, 40, 50, 60, 70, or 80 wt % to an upper limit of 5, 15, 25, 355, 45, 55, 65, 75, 85 or 90 wt %. For example, the amount of component F) can be from 1 to 90 wt %, or in the alternative, from 45 to 90 wt %, or in the alternative, from 1 to 55 wt %, or in the alternative, from 25 to 75 wt %, or in the alternative, from 30 to 70 wt %. The amount of component G) based on the total weight of components D), E), F) and G) combined can range from a lower limit of 0.1, 0.5, 1, 3, 5, 7 or 9 wt % to an upper limit of 0.2, 0.7, 2, 4, 6, 8 or 10 wt %. For example, the amount of component G) can be from 0.1 to 10 wt %, or in the alternative, from 0.1 to 5 wt %, or in the alternative, from 4 to 10 wt %, or in the alternative, from 2 to 8 wt %, or in the alternative, from 0.5 to 2.5 wt %.

The invention also provides an article of manufacture comprising at least one component which comprises the composition according to any one of the preceding claims. In a further embodiment, the article is selected from the group consisting of footwear products. In one embodiment, the at least one component is an adhesive primer for a midsole.

The invention also provides an article comprising at least one component formed from an inventive composition as described herein. In a further embodiment, the article is a footwear product.

In one embodiment, the article further comprising a substrate. In a further embodiment, the substrate is formed from a composition comprising an olefin multi-block copolymer (for example, see U.S. Pat. No. 7,858,706) and, optionally, at least one other polymer. The other polymer differs in one or more properties from the olefin block copolymer, for examples, in density, melt index, Mw, Mn, MWD, comonomer, and/or the amount of comonomer. In one embodiment, the other polymer is an EVA.

In an embodiment, the olefin multi-block copolymer is an ethylene multi-block copolymer (for example, an ethylene/octene multi-block copolymer). Ethylene multi-block copolymers are sold under the Tradename INFUSE Olefin Block Copolymers, available from The Dow Chemical Company, Midland, Mich., USA.

In one embodiment, the invention provides the composition and article of manufacture in accordance with any of the embodiments disclosed herein except that the article of manufacture is selected from the group consisting of footwear. Exemplary footwear include sports shoes, water shoes, boots, safety footwear, and sandals.

In one embodiment, the invention provides the composition and article of manufacture in accordance with any of the embodiments disclosed herein except that the component of the article of manufacture which comprises the composition is an adhesive primer for a midsole.

The invention provides an article of manufacture comprising at least one component formed from an inventive composition. In one embodiment, the article is a footwear product. In one embodiment, the at least one component is an adhesive primer for a midsole.

EXAMPLES

Materials Used in Preparing the Examples:
EVA 7360M: ethylene-vinyl acetate copolymer, density 0.941 g/cm$^3$ (ASTM D792), MI 2.5 g/10 min (ASTM D1238, at 190° C./2.16 kg), Shore A=86 (ASTM D2240), 21 wt % vinyl acetate content (commercially available from Formosa Plastics Corporation (Mialiao Village, Taiwan).
ENGAGE8450: ethylene-octene copolymer, density 0.902 g/cm$^3$ (ASTM D792), MI 3 g/10 min (ASTM D1238, at 190° C./2.16 kg), Shore A=90 (ASTM D2240) (commercially available from The Dow Chemical Company).
ENGAGE 8452: ethylene-octene copolymer, density 0.875 g/cm$^3$ (ASTM D792), MI 3 g/10 min (ASTM D1238, at 190° C./2.16 kg), Shore A=74 (ASTM D2240) (commercially available from The Dow Chemical Company).
INFUSE 9530: olefin block copolymer, density 0.885 g/cm$^3$ (ASTM D792), MI 5 g/10 min (ASTM D1238, at 190° C./2.16 kg), Shore A=83 (ASTM D2240) (commercially available from The Dow Chemical Company).
INFUSE 9107: olefin block copolymer, density 0.866 g/cm$^3$ (ASTM D792), MI 1 g/10 min (ASTM D1238, at 190° C./2.16 kg), Shore A=83 (ASTM D2240) (commercially available from The Dow Chemical Company).
LUPEROX DC40P: dicumyl peroxide from Arkema with active peroxide content around 40 wt % (commercially available from Arkema Inc.).
LUPEROX DC40P-SP2: Scorch protected dicumyl peroxide from Arkema with active peroxide content around 40 wt % (commercially available from Arkema Inc.).
AC9000: Azodicabonamide type blowing (available from Kum Yang (Korea) company).
ZnO: Zinc oxide, local grade
ZnSt: Zinc stearate, local grade
ATOMITE Calcium carbonate (available from Imerys Pigments (Roswell, Ga., USA))

The formulations used for each of the examples (foams) are shown in Table 1. Waterborne Polyurethane Adhesives include adhesives which are commercially available: under the names 6602, 6608, and GE-01 from Great Eastern Resins Industrial Co. Ltd. (Taiwan); under the names NP-57 and NP-580 from Nan Pao Resins Chemical Co. Ltd. (Taiwan); and WU-602L and WU-606 from Iao Son Hong Tinta E Vernizes Lda./Zhong Bu (Centresin) Adhesive & Chemical Co., Ltd. (Macau).

TABLE 1

Olefin-based Polymer Foams Formulations

|  | 100% POE | 70% POE | 50% POE | 50% INFUSE 9530 | 50% INFUSE 9107 | 100% INFUSE 9530 |
|---|---|---|---|---|---|---|
| ENGAGE 8450 | 45 | 31.5 | 22.5 |  |  |  |
| EVA 7360M |  | 30 | 50 | 50 | 50 |  |
| ENGAGE 8452 | 55 | 38.5 | 27.5 |  |  |  |
| INFUSE 9530 |  |  |  | 50 |  | 100 |
| INFUSE9107 |  |  |  |  | 50 |  |
| LUPEROX DC40P | 1.2 | 1.2 | 1.2 | 1.5 | 1.5 | 1.5 |
| LUPEROX DC40P-SP2 | 0.8 | 0.8 | 0.8 | 1 | 1 | 1 |
| AC9000 | 2 | 2 | 2 | 2 | 2 | 2 |
| ZnO | 0.2 | 0.2 | 0.2 | 0.2 | 0.2 | 0.2 |
| ZnSt | 0.2 | 0.2 | 0.2 | 0.2 | 0.2 | 0.2 |
| CaCO$_3$ | 5 | 5 | 5 | 5 | 5 | 5 |

Foam Preparation

Compounding

Polymer pellets were added to a 1.5 liter, Banbury mixer. Then, ZnO, ZnSt and CaCO$_3$ were added, after the polymer had melted (around 5 minutes). The blowing agent and peroxide were added last, after the fillers were uniformly dispersed, and the contents mixed for another 3 to 5 minutes for a total mixing time of 15 minutes. The batch temperature was checked by using a thermo probe detector right after the compounds were discharged. The composition actual temperature was generally 10 to 15° C. higher than the displayed temperature on the equipment (composition temperature was around 100° C.). Hence, during the compounding process, it is better to maintain a lower displayed equipment temperature to ensure the compound temperature does not exceed the decomposition temperature of the curing agent and the decomposition temperature blowing agent. The compounded formulation was placed between two roll mills (maintained at a temperature of about 100 C), and the compounded formulation was formed into a sheet (or roll milled blanket) of about 5 mm in thickness.

Bun Foam Preparation

Roll milled blankets were cut into squares (three or four "6 inch×6 inch"), and placed inside a pre-heated bun foam mold of dimensions around 49 square inches. The surface of the chase was sprayed with mold releasing agent, to avoid sticking of the foam to the chase during de-molding. Two compression molding processes were involved: first a pre-heating process to eliminate air pockets inside the sample and between the stacked blanket layers prior to curing, and then curing/foaming process. The preheating was conducted for 8 minutes at 110° C. (low melting polymer like ENGAGE) or 120° C. (high melting polymer like INFUSE), and pressed at 10 tons, for 4 minutes, to form a solid mass in the mold before foaming. The preheated mass was transferred to the foaming press, and held for 8 minutes at 100 kg/cm$^2$ and 180° C. Once the pressure was released, the bun foam was removed quickly from the tray, and placed in a vent hood on several non-stick sheets, and the top side length was measured as soon as possible. The foam surfaces needed to be insulated from the bench top, using something like the cardboard boxes. Insulating the surfaces of the newly made bun foam will prevent uneven cooling on the top and bottom surface. The foams cool in the hood for 40 minutes then they were transferred to a storage container, and allowed to cool for 24 hours.

Primer Composition Preparation

To make the primer formulation, several pre-solutions were first prepared, including the following. Each wt % based on the weight of the final solution.

To make the primer formulation, several pre-solutions were first prepared, including a. 5 wt % MAH-g-CPO (HARDLEN F-2P from Toyo Kasei) in methyl cyclohexane (MCH) by heating reflux the solution in three neck flask at 80 deg C. for 30 minutes with magnetic stirring. A chlorinated olefin-based polymer is also useful in the primer compositions below.

b. 10 wt % SEBS 1652 (KRATON G1652) in MCH by heating reflux the solution in three neck flask at 80 deg C. for 30 minutes with magnetic stirring.

c. 10 wt % photo initiator 184 (DOUBLECURE 184, supplied by Double Bond Chemical Ind.) directly dissolved in methyl-ethyl-ketone (MEK) at room temperature.

d. 10% HDDA (DOUBLEMER HDDA supplied by Double Bond Chemical Ind.) dissolved in a solvent mixture of MEK/MCH (1/1), by weight.

e. 10% TPGDA (Doublemer TPGDA supplied by Double Bond Chemical Ind.) dissolved in a solvent mixture of MEK/MCH (1/1), by weight.

Then the pre-solutions (a~e) were carefully weighed according to the calculated weight in order to make the final primer compositions, each with the weight ratio as shown below. Each wt % is based on the weight of the primer solution.

Comparative Example (CE)-1 utilized a commercial UV primer.

CE-2 utilized a primer composition as follows: (no SEBS): HDDA/TPGDA/F2P/184 (40/40/20/6.4) dissolved in MCH/MEK solvent mixture (solid level around 2.5 wt %).

CE-3 utilized a primer composition as follows: (no SEBS): HDDA/TPGDA/F2P/184 (30/30/40/4.8) dissolved in MCH/MEK solvent mixture (solid level around 2.5 wt %).

Inventive Example (IE)-1 utilized a primer composition as follows: HDDA/TPGDA/F2P/SEBS/184 (40/40/20/30/6.4) dissolved in MCH/MEK solvent mixture (solid level around 2.5 wt %).

IE-2 utilized a primer composition as follows: HDDA/TPGDA/F2P/SEBS/184 (30/30/40//10/4.8) dissolved in MCH/MEK solvent mixture (solid level around 2.5 wt %).

IE-3 utilized a primer composition as follows: HDDA/TPGDA/F2P/SEBS/184 (30/30/40//20/4.8) dissolved in MCH/MEK solvent mixture (solid level around 2.5 wt %).

IE-4 utilized a primer composition as follows: HDDA/TPGDA/F2P/SEBS/184 (20/20/60//20/3.2) dissolved in MCH/MEK solvent mixture (solid level around 2.5 wt %).

Bonding Procedure Description

The olefin-based polymer foam slabs were cut into "15 cm (L)*2.5 cm (W)*0.5 cm (T)" test substrate foams for the bonding test (T-Peel).

The test sample for the T-Peel adhesion test is shown in FIG. 1 (cross-section schematic). The test sample preparation is outlined in FIG. 2.

Figure 2:
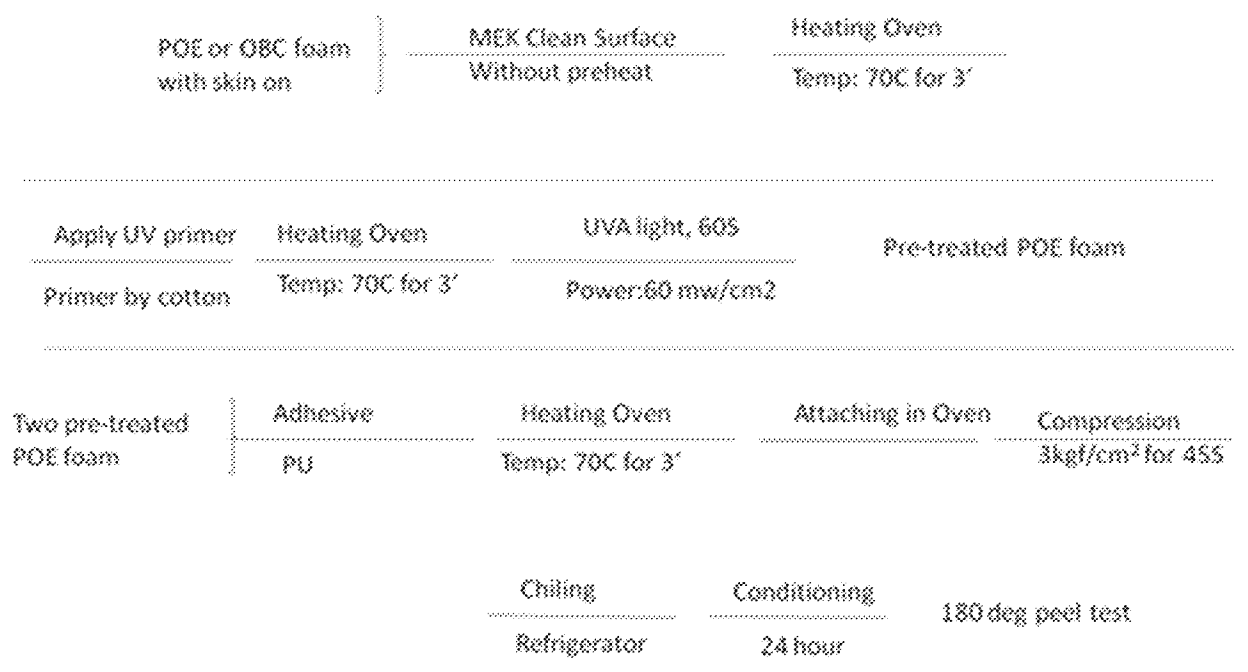

Each primer composition (about a coating weight of 5-10 g solid per one square meter of one substrate) was applied onto the skin side of two test substrate foams, and the primed foams were thermally treated to remove solvent (see FIG. 2). Then a commercially available waterborne polyurethane (PU) adhesive typically used in the footwear industry was applied on each primed olefin-based foam skin. The PU was applied onto the primed surface. Finally the two PU coated foam skin were adhered together at 70° C., and under a pressure of 3 kgf/cm$^2$. The PU adhesive on both sides of the foam skin surface reacted to form a "PU adhesive layer" located between the two olefin-based foam substrates.

The resulted bonded test sample was as follows: a sandwich structure POE foam/Primer/PU Adhesive/Primer/POE foam. A "1 inch" portion of the test sample was un-adhered, in order to easily separate the two POE foam for insertion into the clamps of the T-Peel test instron. The adhered portion of the test sample was around "5 inch" in length and around "1 inch (2.5 cm)" in width. The test sample provided a good representation of the bonded foams in a footwear component.

The T-peel test was conducted in an INSTRON 5566. The un-adhered ends of the bonded sample were clamped in the top and bottom clamps, respectively, of the instron. The initial clamp distance was 1 inch. The bonded sample was peeled at a crosshead speed of 100 mm/min. The Peel force was recorded and average peel force was calculated. Peel strength (N/mm) was calculated as follows: average peel force (N)/sample width (mm).

Figure 3:
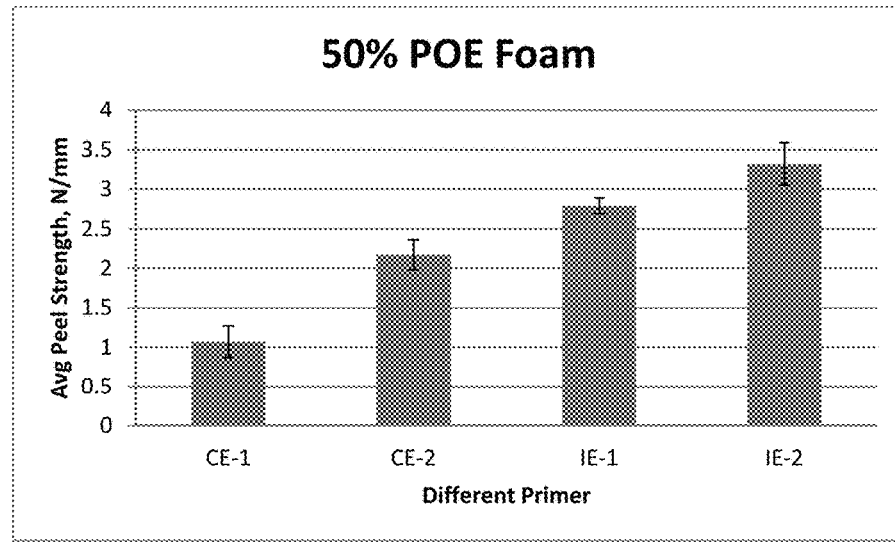
FIG. 3 is a chart illustrating the average peel strength for Comparative Examples 1 and 2 and Inventive Examples 1 and 2 on a 50% POE foam substrate.

FIG. 3 shows the bonding performance of different examples, using the 50 wt % POE based foam. As shown in FIG. 3, the foams bonded with the inventive primer compositions had significantly higher average peel strengths, as compared to the foams primed with the comparative primer compositions.

Figure 4:
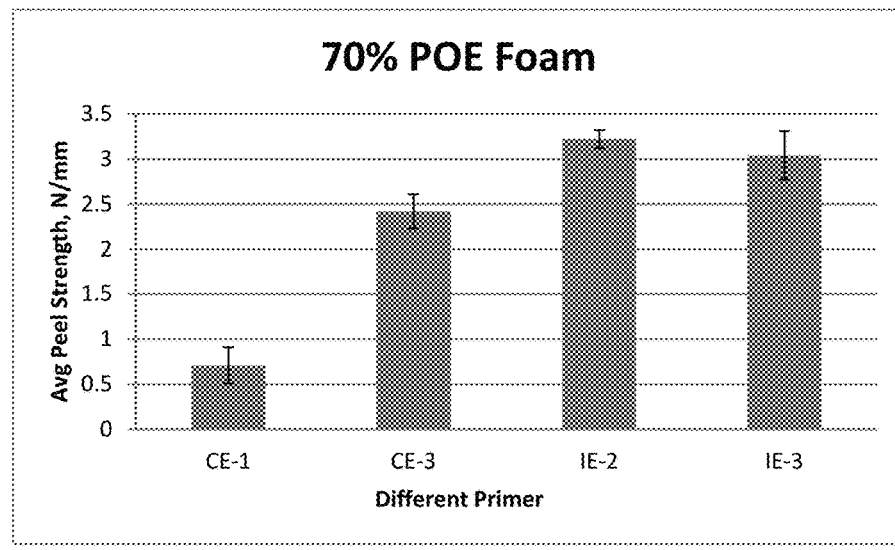
FIG. 4 is a chart illustrating the average peel strength for Comparative Examples 1 and 3 and Inventive Examples 2 and 3 on a 70% POE foam substrate.

FIG. 4 is similar to FIG. 3, except the POE loading in the foam is further increased to 70 wt %. Similarly the inventive examples are still better than the comparative examples, and could also provide acceptable bonding strength for even 70 wt % POE loading foam.

Figure 5:
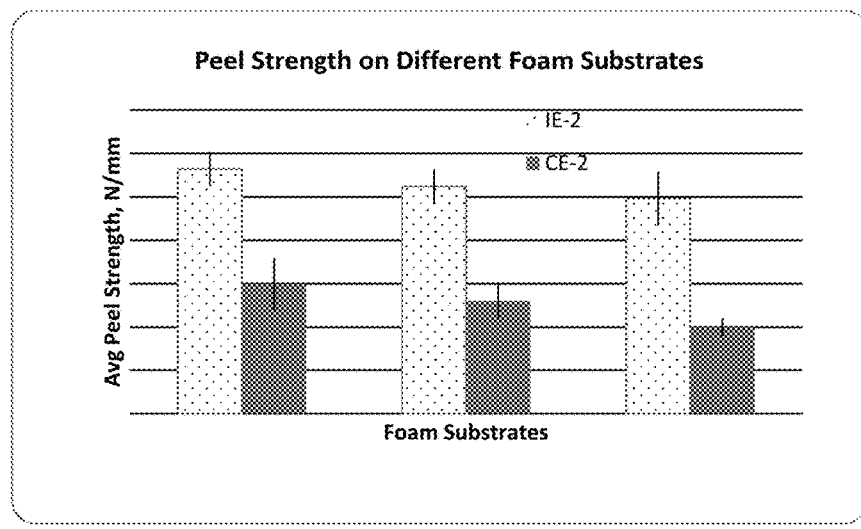
FIG. 5 is a chart illustrating the impact on peel strength of Inventive Example 4 on various substrates.

FIG. 5 shows the bonding performance of inventive primer on different POE, OBC based foam substrates. The corresponding peel strength is over 3 N/mm for even 100% POE or 100% OBC based foam by using the inventive primers.

The invention claimed is:
1. A composition comprising the following A)-C):
A) a compound selected from the group consisting of one or more monomers and one or more oligomers, the monomers and oligomers each selected from the group consisting of

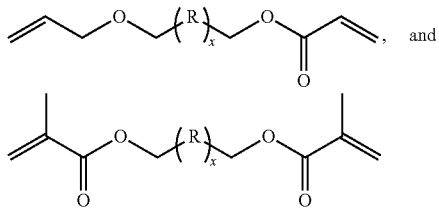

wherein each R is independently selected from the group consisting of the following; substituted or unsubstituted hydrocarbylenes, and substituted or unsubstituted hetero-hydrocarbylenes, each of the hydrocarbylenes and hetero-hydrocarbylenes having between 4 and 40 carbon atoms and x is any integer equal to or greater than 1;
B) maleic anyhydride grafted chlorinated polyolefin having a chlorine content from 15 to 30 wt%;
C) at least one styrene-based block copolymer or derivative thereof, and
G) at least one photoinitiator;
wherein the composition comprises from 0.1 to 90 wt % component A), from 1 to 90 wt % component B), from 1 to 90 wt % component C) and from 0.1 to 10 wt % component G), each based on the total weight of components A), B), C) and G) combined.

2. A composition comprising the following D)-F):
D) at least one compound selected from the following i) through v):
  i) $Z^1$—$(CR^1R^2$—O—C(O)—$CR^3$=$CH_2)_2$ (Formula 1); wherein, for Formula 1, $Z^1$ is selected from an unsubstituted hydrocarbylene, a substituted hydrocarbylene, an unsubstituted hetero-hydrocarbylene, or a substituted hetero-hydrocarbylene; each $R^1$ is independently selected from hydrogen or an alkyl; each $R^2$ is independently selected from hydrogen or an alkyl; $R^3$ is selected from hydrogen or an alkyl;
  ii) $Z^2_{(4-x)}$—C—[$CR^4R^5$—$(R^6)_y$—O—C(O)—$CR^7$=$CH_2]_x$ (Formula 2), wherein for Formula 2, $Z^2$ is selected from hydrogen, an unsubstituted hydrocarbyl, a substituted hydrocarbyl, an unsubstituted hetero-hydrocarbyl, or a substituted hetero-hydrocarbyl; $R^4$ is selected from hydrogen or an alkyl; $R^5$ is selected from hydrogen or an alkyl; $R^6$ is selected from an unsubstituted hydrocarbylene, a substituted hydrocarbylene, an unsubstituted hetero-hydrocarbylene, or a substituted hetero-hydrocarbylene; y≥0; and when y=0, $R^6$ is not present; $R^7$ is selected from hydrogen or an alkyl; and x is from 1 to 4; and when x=4, $Z^2$ is not present;
  iii) $Z^3_{(3-x)}$—$CR^8$—[$CR^9R^{10}$—$(R^{11})_y$—O—C(O)—$CR^{12}$=$CH_2]_x$ (Formula 3), wherein for Formula 3, $Z^3$ is selected from hydrogen, an unsubstituted hydrocarbyl, a substituted hydrocarbyl, an unsubstituted hetero-hydrocarbyl, or a substituted hetero-hydrocarbyl; $R^8$ is -(T-O—C(O)—CR=CH2) where R is hydrogen or alkyl, and T is selected from an unsubstituted hydrocarbylene, a substituted hydrocarbylene, an unsubstituted hetero-hydrocarbylene, or a substituted hetero-hydrocarbylene; $R^9$ is selected from hydrogen or an alkyl; $R^{10}$ is selected from hydrogen or an alkyl; $R^{11}$ is selected from an unsubstituted hydrocarbylene, a substituted hydrocarbylene, an unsubstituted hetero-hydrocarbylene, or a substituted hetero-hydrocarbylene; y≥0; and when y=0, $R^{11}$ is not present; $R^{12}$ is selected from hydrogen or an alkyl; and x is from 1 to 3; and when x=3, $Z^3$ is not present;
  iv) O—{$CR^{13}R^{14}$—$C(Z^4_{(3-x)})$—[$CR^{15}R^{16}$—$(R^{17})_y$—O—C(O)—$CR^{18}$=$CH_2]_x\}_2$ (Formula 4), wherein for Formula 4, $Z^4$ is selected from hydrogen, an unsubstituted hydrocarbyl, a substituted hydrocarbyl, an unsubstituted hetero-hydrocarbyl, or a substituted hetero-hydrocarbyl; $R^{13}$ is selected from hydrogen or an alkyl; $R^{14}$ is selected from hydrogen or an alkyl; $R^{15}$ is selected from hydrogen or an alkyl; $R^{16}$ is selected from hydrogen or an alkyl; $R^{17}$ is selected from an unsubstituted hydrocarbylene, a substituted hydrocarbylene, an unsubstituted hetero-hydrocarbylene, or a substituted hetero-hydrocarbylene; y≥0, and when y=0, $R^{17}$ is not present; $R^{18}$ is selected from hydrogen or an alkyl; and x is from 1 to 3; and when x=3, $Z^4$ is not present;
  v) a combination of two or more from Formulas 1 through 4 above;
E) maleic anyhydride grafted chlorinated polyolefin having a chlorine content from 15 to 30 wt%;
F) at least one styrene-based block copolymer or derivative thereof; and
G) at least one photoinitiator;
wherein the composition comprises from 0.1 to 90 wt % component D), from 1 to 90 wt % component E), from 1 to 90 wt % component F) and from 0.1 to 10 wt % component G), each based on the total weight of components D), E), F) and G) combined.

3. The composition of claim 2, wherein, for Formula 1, $Z^1$ is selected from the following:
  CHR—O—CHR—, wherein each R is independently H or alkyl; —CHR—O—CHRCHR—O—CHR—, wherein each R is independently H or alkyl; or —(CHR)n-, wherein R is H or alkyl, and n≥1;
  for Formula 2, $Z^2$ is selected from an unsubstituted hydrocarbyl; $R^6$ is selected from an unsubstituted hydrocarbylene, or an unsubstituted hetero-hydrocarbylene;
  for Formula 3, $Z^3$ is selected from hydrogen or an unsubstituted hydrocarbyl; $R^{11}$ is selected from an unsubstituted hydrocarbylene, or an unsubstituted hetero-hydrocarbylene; and
  for Formula 4, $Z^4$ is selected from an unsubstituted hydrocarbyl; $R^{17}$ is selected from an unsubstituted hydrocarbylene, or an unsubstituted hetero-hydrocarbylene.

4. The composition of claim 1, wherein the at least one compound of A) is selected from the following: (a) through (l):

(a)

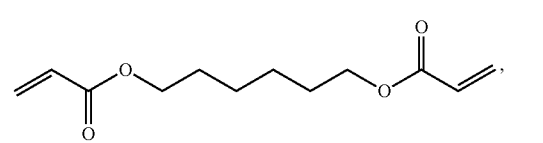

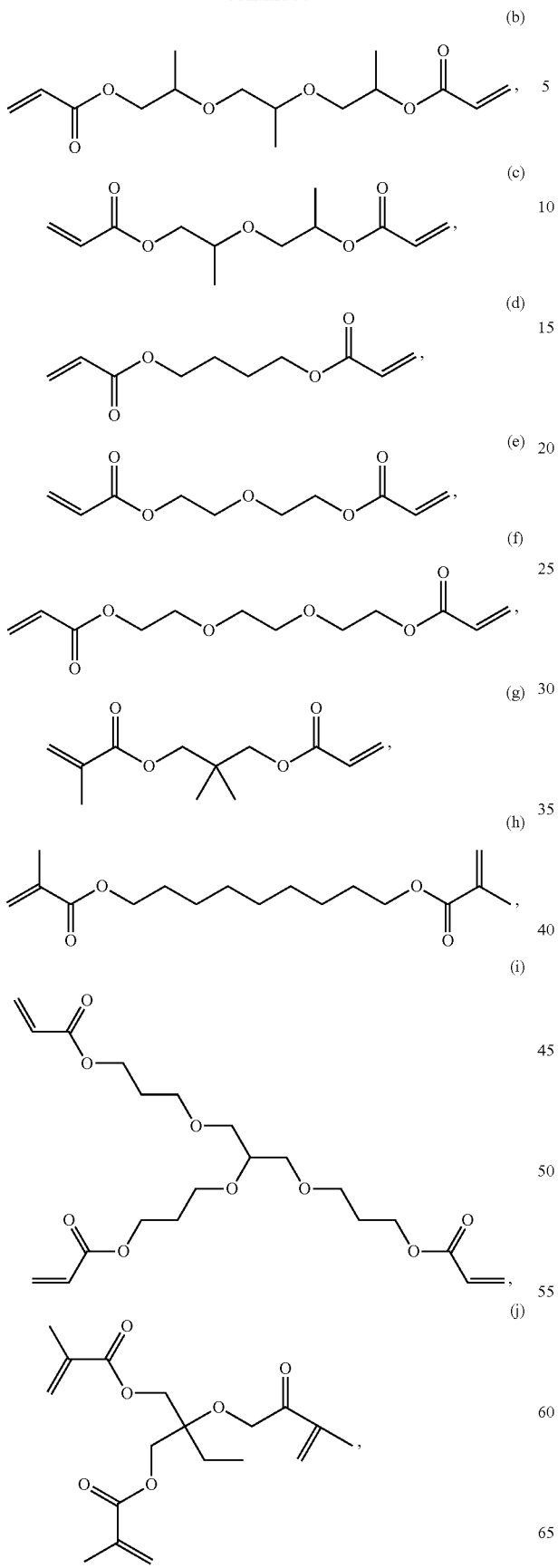
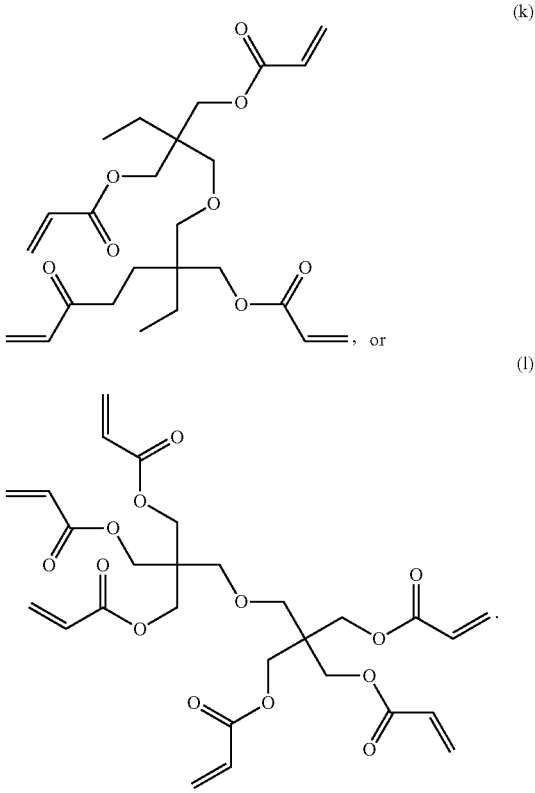

5. The composition according to claim 1, further comprising H) one or more non-aromatic and nonchlorinated organic solvents.

6. The composition according to claim 2, wherein the at least one compound of component D) is selected from the group consisting of the following: 1,6-hexanediol dimethacrylate (HDDA), tripropylene glycol diacrylate (TPGDA); dipropylene glycol diacrylate (DPGDA) and 1,4-butanediol diacrylate (BDDA).

7. The composition according to claim 2, wherein the at least one compound of component D) is selected from the group consisting of the following: Diethylene glycol diacrylate; Triethylene glycol diacrylate; Neopentyl glycol diacrylate (NPGDA); and NonanediolDiacrylate (NDDA).

8. The composition according to claim 1, wherein the at least one styrene-based block copolymer or derivative thereof, component C), is selected from the group consisting of the following: styrene-ethylene/butylene-styrene block copolymer (SEBS), styrene/butadiene/styrene block copolymer (SBS), and maleic anhydride grafted styrene-ethylene/butylene-styrene block copolymer (SEBS-g-MAH).

9. The composition according to claim 5, wherein the composition comprises from 0.1 to 10 wt % combined amount of components A), B), C) and G) and from 99.9 to 90 wt % of the one or more non-aromatic and nonchlorinated organic solvents; each wt % based on the weight of the composition.

10. An article comprising at least one component formed from the composition of claim 1.

11. The article of claim 10, further comprising a substrate.

12. The article of claim 11, wherein the substrate is formed from a composition comprising an olefin multi-block copolymer, and, optionally, at least one other polymer.

13. The composition of claim 2, wherein the at least one compound of D) is selected from the following: (a) through (l):

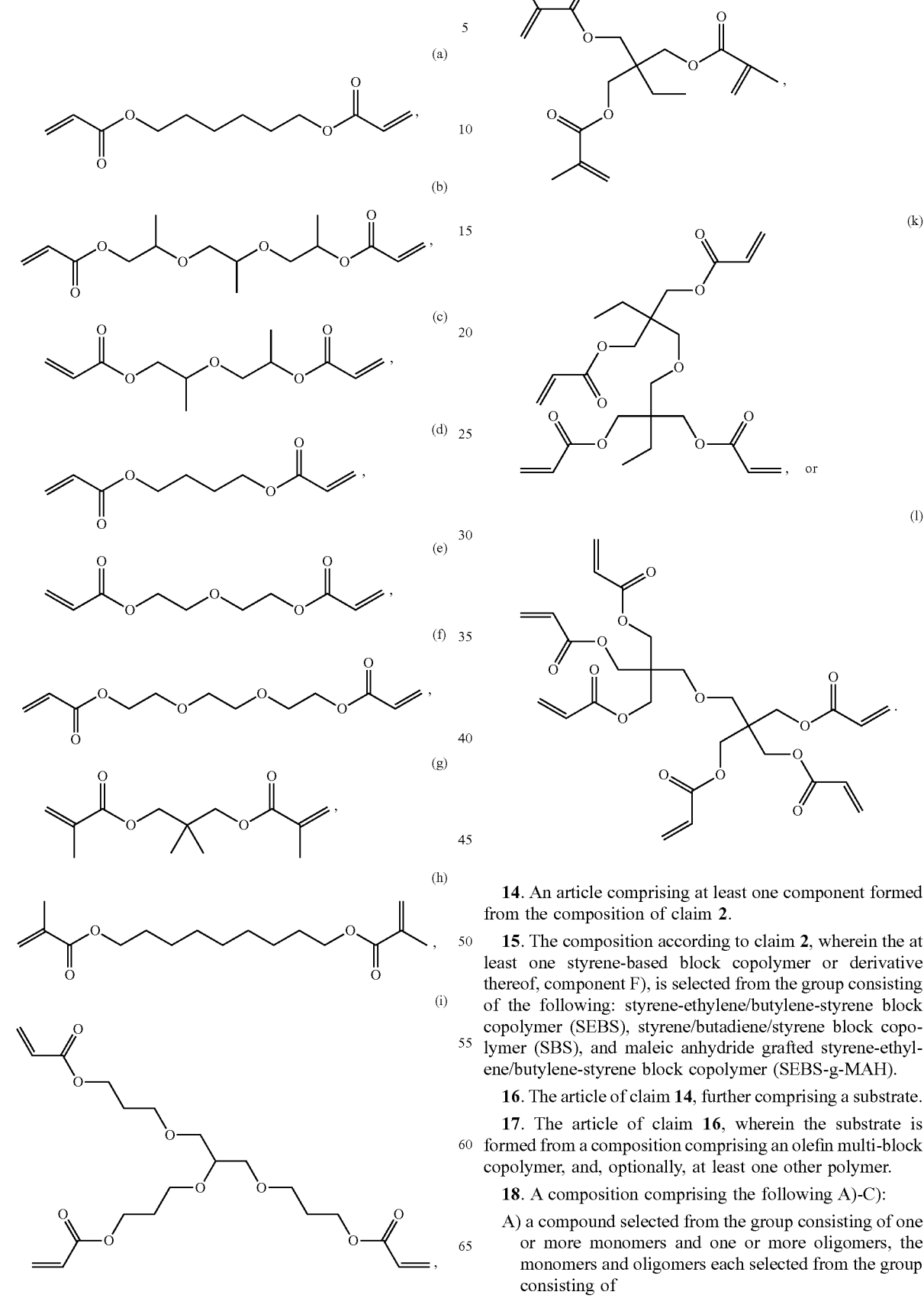

14. An article comprising at least one component formed from the composition of claim 2.

15. The composition according to claim 2, wherein the at least one styrene-based block copolymer or derivative thereof, component F), is selected from the group consisting of the following: styrene-ethylene/butylene-styrene block copolymer (SEBS), styrene/butadiene/styrene block copolymer (SBS), and maleic anhydride grafted styrene-ethylene/butylene-styrene block copolymer (SEBS-g-MAH).

16. The article of claim 14, further comprising a substrate.

17. The article of claim 16, wherein the substrate is formed from a composition comprising an olefin multi-block copolymer, and, optionally, at least one other polymer.

18. A composition comprising the following A)-C):

A) a compound selected from the group consisting of one or more monomers and one or more oligomers, the monomers and oligomers each selected from the group consisting of

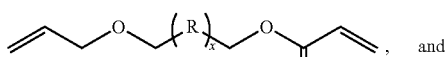, and

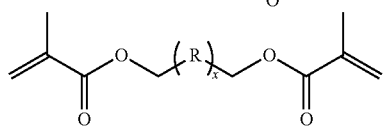

wherein each R is independently selected from the group consisting of the following; substituted or unsubstituted hydrocarbylenes, and substituted or unsubstituted hetero-hydrocarbylenes, each of the hydrocarbylenes and hetero-hydrocarbylenes having between 4 and 40 carbon atoms and x is any integer equal to or greater than 1;

B) at least one chlorinated olefin-based polymer selected from the group consisting of chlorinated olefin-based polymers that have a chlorine content from 10 to 40 wt%, based on the weight of the chlorinated olefin-based polymer;

C) at least one styrene-based block copolymer or derivative thereof,

G) at least one photoinitiator;

wherein the composition comprises from 0.1 to 90 wt% component A), from 1 to 90 wt% component B), from 1 to 90 wt% component C) and from 0.1 to 10 wt% component G), each based on the total weight of components A), B), C) and G) combined; and H) one or more non-aromatic and nonchlorinated organic solvents.

* * * * *